(12) United States Patent
Shah et al.

(10) Patent No.: US 9,411,452 B2
(45) Date of Patent: Aug. 9, 2016

(54) SYSTEM AND METHOD FOR IMPROVING IMPACT SAFETY

(71) Applicant: Panasonic Avionics Corporation, Lake Forest, CA (US)

(72) Inventors: Shrenik Shah, Laguna Niguel, CA (US); Charles Pitzer, Playa Del Rey, CA (US)

(73) Assignee: Panasonic Avionics Corporation, Lake Forest, CA (US)

(*) Notice: Subject to any disclaimer, the term of this patent is extended or adjusted under 35 U.S.C. 154(b) by 523 days.

(21) Appl. No.: 13/949,118

(22) Filed: Jul. 23, 2013

(65) Prior Publication Data

US 2015/0261363 A1 Sep. 17, 2015

Related U.S. Application Data

(60) Provisional application No. 61/681,010, filed on Aug. 8, 2012.

(51) Int. Cl.
*G06F 1/16* (2006.01)
*G06F 3/041* (2006.01)
(Continued)

(52) U.S. Cl.
CPC ............ *G06F 3/0412* (2013.01); *B32B 3/02* (2013.01); *B32B 3/263* (2013.01); *B32B 17/06* (2013.01);
(Continued)

(58) Field of Classification Search
CPC ....... G06F 3/0412; C03C 21/002; B32B 3/02; B32B 27/365; B32B 17/06; B32B 3/263; B32B 17/10018; B32B 17/10146; B32B 17/10009; B60R 21/055; B60R 11/00; B60R 11/02; B60R 11/0235; Y10T 29/49826; Y10T 428/24612; Y10T 428/31507; Y10T 428/24488

USPC ......... 361/679.01, 679.21–679.3; 349/56–60; 206/775–783; 428/15
See application file for complete search history.

(56) References Cited

U.S. PATENT DOCUMENTS

| 4,804,886 A | 2/1989 | Nolan et al. |
| 5,283,696 A | 2/1994 | Lanswer et al. |

(Continued)

FOREIGN PATENT DOCUMENTS

| DE | 10 2011 115 158 A1 | 3/2013 |
| EP | 1 736 358 A1 | 12/2006 |

(Continued)

OTHER PUBLICATIONS

Communication, Extended European Search Report, EP App. No. 13 17 8784, Nov. 12, 2013.

*Primary Examiner* — Hoa C Nguyen
*Assistant Examiner* — Sagar Shrestha
(74) *Attorney, Agent, or Firm* — Orrick, Herrington & Sutcliff LLP

(57) ABSTRACT

A system for improving the impact safety and methods for manufacturing and using same. The system includes a panel that comprises a panel surface having a frangible region. The panel can be formed from a translucent material, such as glass. The frangible region is indistinguishable from the remainder of the panel during normal conditions but enables the panel to break in a safe, predictable manner when a predetermined amount of force is applied to the frangible region. Thereby, the panel does not shatter or form sharp shards. Instead, the frangible region breaks away from the panel as an intact unit without internal fracturing. Risk of personal injury thereby can be minimized. The lack of sharp shards likewise facilitates clean up and replacement of the broken panel. The panel advantageously can be applied in video monitors and emergency equipment such as fire extinguisher cabinets disposed aboard passenger vehicles and in stationary environments such as the home or office.

20 Claims, 42 Drawing Sheets

(51) Int. Cl.
*B32B 17/10* (2006.01)
*B60R 11/02* (2006.01)
*B60R 21/055* (2006.01)
*B32B 3/02* (2006.01)
*B32B 3/26* (2006.01)
*B32B 17/06* (2006.01)
*B32B 27/36* (2006.01)
*C03C 21/00* (2006.01)
*B60R 11/00* (2006.01)

(52) U.S. Cl.
CPC ..... *B32B 17/10009* (2013.01); *B32B 17/10018* (2013.01); *B32B 17/10146* (2013.01); *B32B 27/365* (2013.01); *B60R 11/0235* (2013.01); *B60R 21/055* (2013.01); *C03C 21/002* (2013.01); *B32B 2457/208* (2013.01); *B60R 2011/0012* (2013.01); *G06F 2203/04102* (2013.01); *G06F 2203/04103* (2013.01); *Y10T 29/49826* (2015.01); *Y10T 428/24488* (2015.01); *Y10T 428/24612* (2015.01); *Y10T 428/31507* (2015.04)

(56) References Cited

U.S. PATENT DOCUMENTS

| | | | |
|---|---|---|---|
| 5,299,397 A | 4/1994 | Ahern | |
| 5,350,613 A * | 9/1994 | Deprez | B32B 17/10036 296/84.1 |
| 5,398,991 A | 3/1995 | Smith et al. | |
| 6,088,069 A * | 7/2000 | Farlow | G02F 1/133308 345/173 |
| 7,326,454 B2 * | 2/2008 | Kraemling | B32B 17/10036 428/410 |
| 7,345,934 B2 | 3/2008 | Guterman et al. | |
| 7,981,541 B2 | 7/2011 | Sato et al. | |
| 8,135,773 B2 | 3/2012 | Stopniewicz et al. | |
| 2003/0104210 A1 * | 6/2003 | Azumi | B32B 17/10018 428/411.1 |
| 2003/0152145 A1 | 8/2003 | Kawakita | |
| 2003/0211333 A1 * | 11/2003 | Watanabe | B32B 7/02 428/422.8 |
| 2004/0209053 A1 * | 10/2004 | Holtmann | B32B 17/10036 428/204 |
| 2005/0001456 A1 * | 1/2005 | Bohm | B32B 17/10018 296/215 |
| 2005/0077826 A1 * | 4/2005 | Watanabe | B32B 7/02 313/587 |
| 2009/0077595 A1 | 3/2009 | Sizelove et al. | |
| 2009/0079705 A1 | 3/2009 | Sizelove et al. | |
| 2009/0083805 A1 | 3/2009 | Sizelove et al. | |
| 2009/0096937 A1 | 4/2009 | Bauer et al. | |
| 2009/0119721 A1 | 5/2009 | Perlman et al. | |
| 2011/0037725 A1 | 2/2011 | Pryor | |
| 2011/0141057 A1 | 6/2011 | Sizelove | |
| 2011/0143835 A1 | 6/2011 | Sizelove | |
| 2011/0174926 A1 | 7/2011 | Margis et al. | |
| 2011/0310539 A1 | 12/2011 | Dai | |
| 2012/0132746 A1 | 5/2012 | Sizelove | |
| 2013/0196091 A1 * | 8/2013 | Wildenhain | B32B 17/069 428/34 |
| 2013/0279140 A1 * | 10/2013 | Pilkington | B32B 17/10036 361/807 |

FOREIGN PATENT DOCUMENTS

| | | |
|---|---|---|
| JP | 2010-82250 A | 4/2010 |
| WO | WO 2012/085083 A1 | 6/2012 |

* cited by examiner

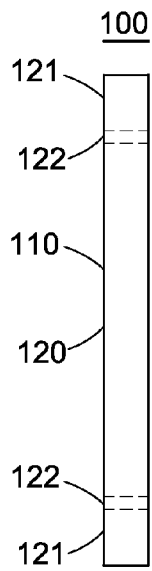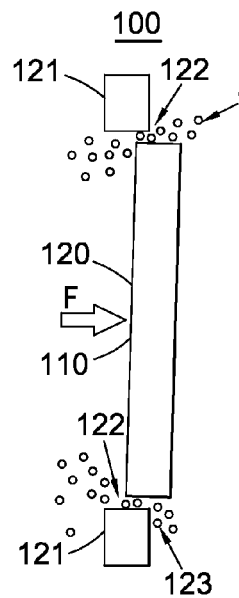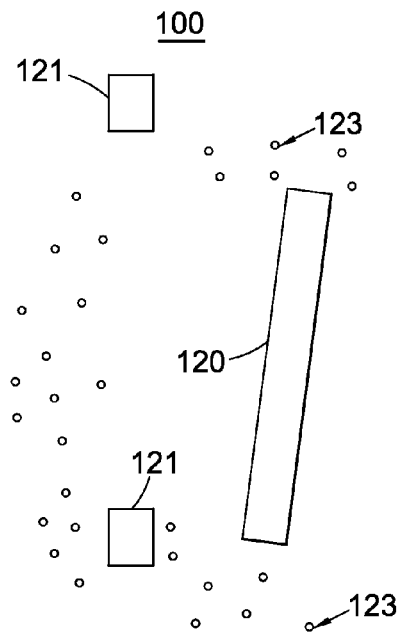
Fig. 4A    Fig. 4B    Fig. 4C
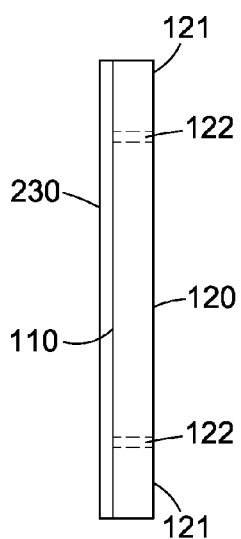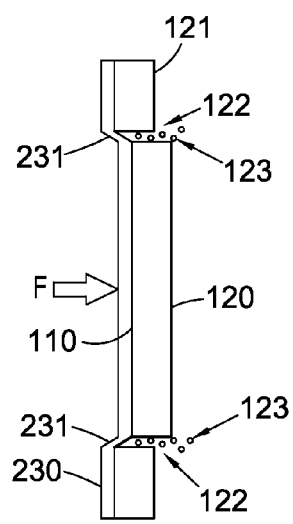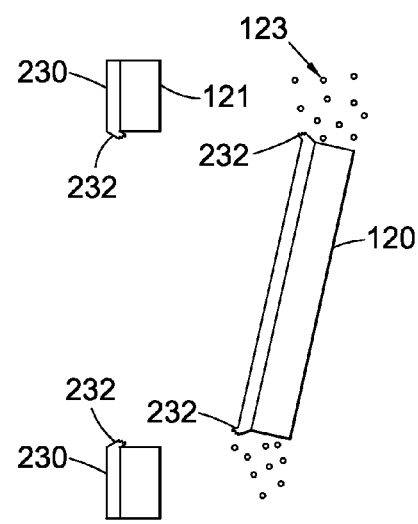
Fig. 5A    Fig. 5B    Fig. 5C

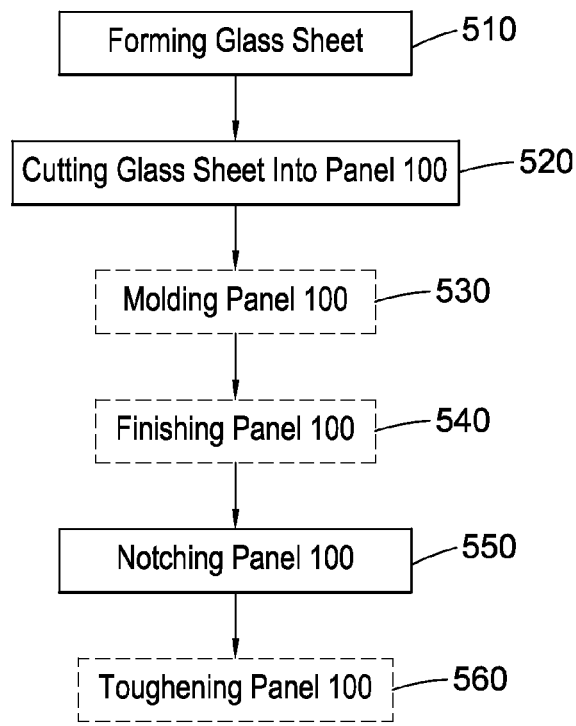
Fig. 25
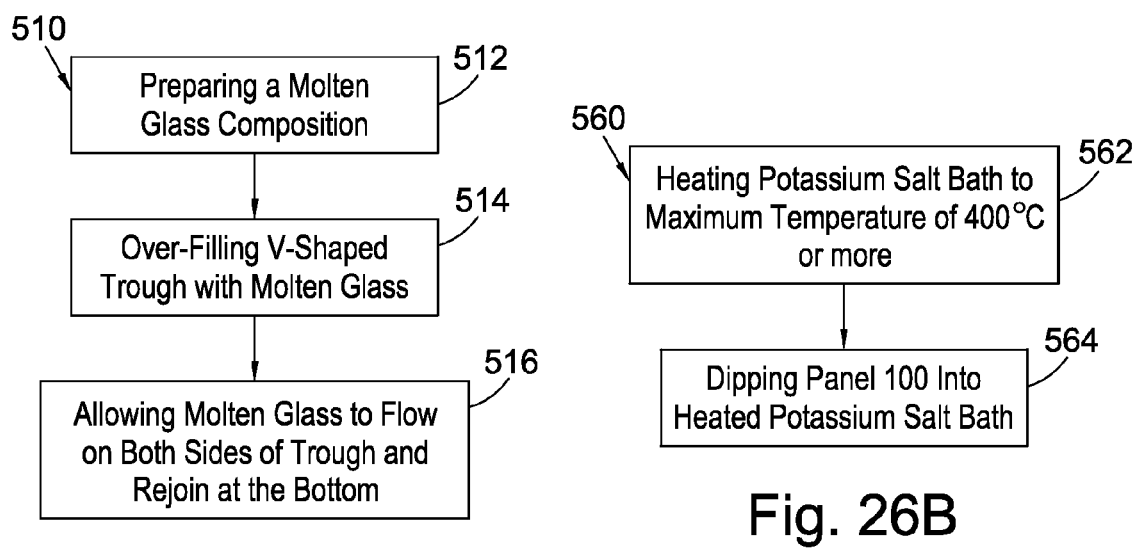
Fig. 26A
Fig. 26B

SYSTEM AND METHOD FOR IMPROVING IMPACT SAFETY

CROSS-REFERENCE TO RELATED APPLICATIONS

This application claims priority to U.S. Provisional Patent Application No. 61/681,010, filed Aug. 8, 2012. Priority to the provisional patent application is expressly claimed, and the disclosure of the provisional patent application is hereby incorporated herein by reference in its entirety and for all purposes.

FIELD

The disclosed embodiments relate generally to impact safety and more particularly, but not exclusively, to translucent panels with one or more frangible regions for enabling the translucent material to fail in a predictable manner upon being impacted.

BACKGROUND

Vehicles, such as automobiles and aircraft, often include regions within the passenger cabin that include glass panes. The glass panes, for example, can be associated with a windshield or window of the vehicle.

If equipped with passenger entertainment systems, the vehicles often include video monitors for displaying information and otherwise entertaining passengers during travel. For various reasons, it is desirable for such monitors to include a front cover made of glass. Glass, however, can shatter, breaking into dangerous shards when struck. The glass can be struck by a head or other appendage of a passenger, injuring the passenger, if the vehicle suddenly decelerates or swerves during travel or if an emergency situation arises. Besides the potential for injury to passengers, broken glass is also difficult and dangerous for clean-up crews to remove.

Conventional video monitors typically have a front cover that is made of glass. These front covers do not fail in a safe and predictable manner during delethalization testing of the Head Injury Criteria as defined by the Federal Aviation Administration. That is, either shards of glass or the entire glass cover fall into the passenger cabin during such testing. Recognizing the desirability of incorporating video monitors with a front cover made of glass, airlines and their suppliers have tried unsuccessfully for years to design a front cover made of glass that fails in a safe and predictable manner.

In view of the foregoing, a need exists for a system and method for providing a translucent material and assembly that promotes impact safety in transportation and other operating environments.

BRIEF DESCRIPTION OF THE DRAWINGS

FIG. 4A is an exemplary detail drawing illustrating another embodiment of the panel of FIG. 1, wherein the panel comprises a panel surface with a frangible region and a remainder separated by a boundary having a non-zero width.

FIG. 4B is an exemplary detail drawing illustrating an embodiment of the panel of FIG. 4A, wherein when a force is applied to the panel, the boundary disintegrates into a spall, allowing the frangible region to break away from the remainder.

FIG. 4C is an exemplary detail drawing illustrating an embodiment of the panel of FIG. 4A, wherein the frangible region is detached from the remainder and a spall has dispersed.

FIG. 5A is an exemplary detail drawing illustrating another embodiment of the panel of FIG. 1, wherein the panel comprises a film applied to a panel surface with a frangible region and a remainder separated by a boundary having a non-zero width.

FIG. 5B is an exemplary detail drawing illustrating an embodiment of the panel of FIG. 5A, wherein when a force is applied to the panel, the boundary disintegrates into a spall, allowing the frangible region to break away from the remainder.

FIG. 5C is an exemplary detail drawing illustrating an embodiment of the panel of FIG. 5A, wherein the frangible region is detached from the remainder and the film has torn yet controlled dispersion of a spall.

FIG. 25 is a flowchart illustrating an exemplary method of fabricating the panel of FIG. 1, wherein the method includes forming a glass sheet and toughening the panel.

FIG. 26A is a flowchart illustrating an exemplary method of forming the glass sheet in accordance with the method of FIG. 25.

FIG. 26B is a flowchart illustrating an exemplary method of toughening the panel in accordance with the method of FIG. 25.

Figure 1:
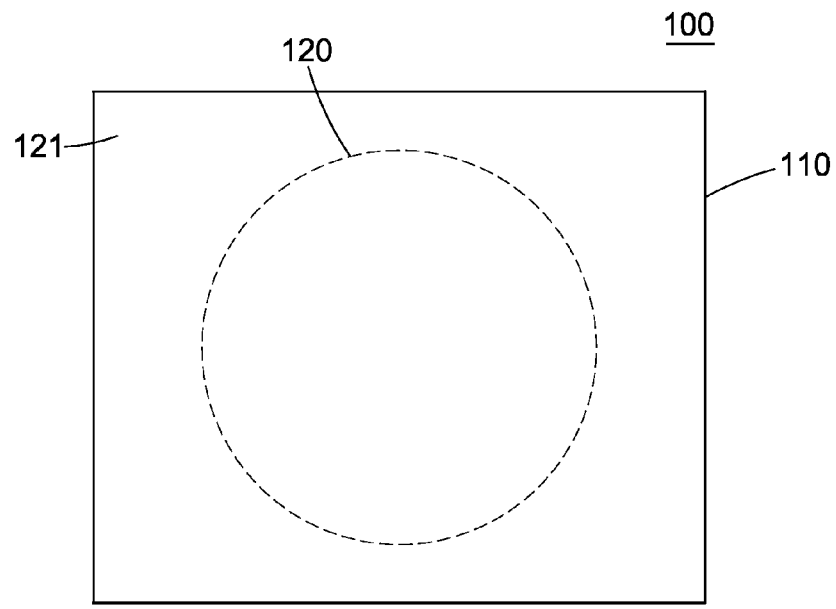
FIG. 1 is an exemplary top-level drawing illustrating an embodiment of a panel for improved impact safety.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available video monitors include a glass front cover that, when struck, can shatter and break into dangerous shards, a translucent panel that breaks in a predictable manner can prove desirable and provide a basis for a wide range of applications, such as front covers for video monitors used aboard vehicles such as automobiles and aircraft as well as for use in portable or home/office devices such as smart phones, tablets, and televisions. This result can be achieved, according to one embodiment disclosed herein, by a panel 100 as illustrated in FIG. 1.

Turning to FIG. 1, the panel 100 is illustrated as comprising a panel surface 110 having a frangible region 120. The frangible region 120 preferably is indistinguishable from the remainder 121 of the panel surface 110 during normal conditions but is adapted to enable the panel 100 to break in a safe, predictable manner when a predetermined amount of force is applied to the frangible region 120. Stated somewhat differently, the panel 100, when struck, does not shatter and/or form sharp shards that can injure nearby persons. Instead, the frangible region 120 can break away from the remainder 121 of the panel 100, preferably as an intact unit without internal fracturing. Risk of personal injury thereby can be minimized. Advantageously, the lack of sharp shards likewise can facilitate clean up and/or replacement of the broken panel 100.

The frangible region 120, like the panel 100 itself, can be formed from any conventional material and can be provided with any suitable size, thickness, dimension, and/or geometry. As illustrated in FIG. 1, for example, the panel 100 can be formed as a rectangular panel with a rounded frangible region 120. Although illustrated as comprising a central region of the panel surface 110 for purpose of illustration only, the frangible region 120 can be provided at any suitable area of the panel surface 110. In one embodiment, the panel surface 110 can include a plurality of the frangible regions 120 each being provided in the manner set forth above.

Figures 2A, 2B, 2C:
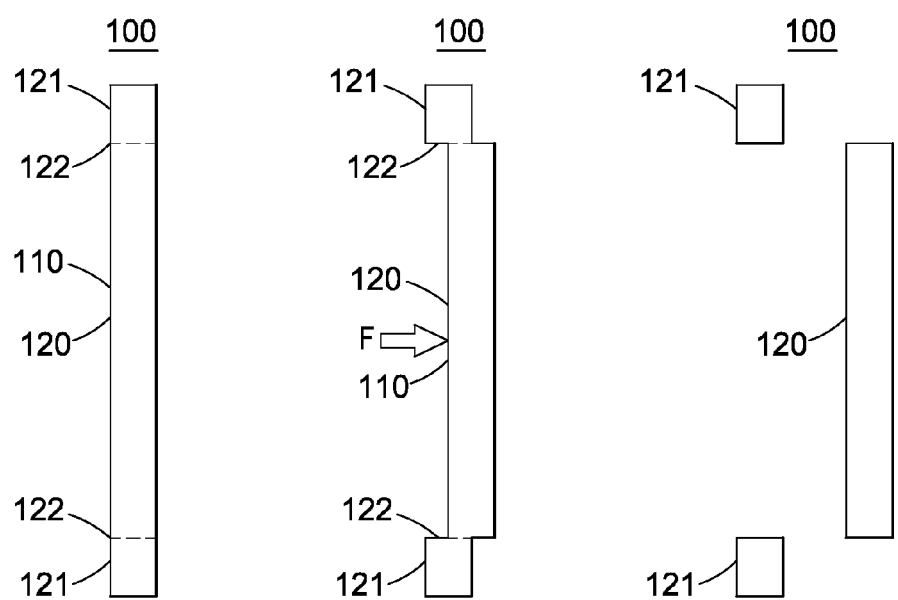
FIG. 2A is an exemplary detail drawing illustrating an embodiment of the panel of FIG. 1, wherein the panel comprises a panel surface with a frangible region and a remainder separated by a boundary.
FIG. 2B is an exemplary detail drawing illustrating an embodiment of the panel of FIG. 2A, wherein when a force is applied to the panel, the boundary disintegrates, allowing the frangible region to break away from the remainder.
FIG. 2C is an exemplary detail drawing illustrating an embodiment of the panel of FIG. 2A, wherein the frangible region is detached from the remainder.

FIG. 2A, illustrates an exemplary cut-away side view of panel 100 with a boundary 122 separating a frangible region 120 from a remainder 122. Turning to FIG. 2B, upon application of a force (F) on a panel surface 110 of the frangible region 120 of the panel 100, the boundary 122 disintegrates, allowing the frangible region 120 to break away from the remainder 121 of the panel 100. In the aftermath of the application of the force (F) as illustrated in FIG. 2B, the frangible region 120 is intact and detached from the remainder 121 of the panel 100 as illustrated in FIG. 2C.

Figure 3A:
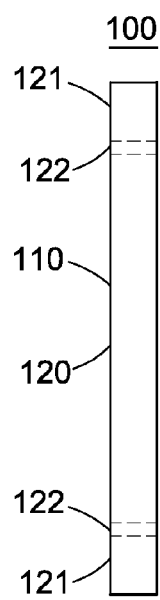
FIG. 3A is an exemplary detail drawing illustrating another embodiment of the panel of FIG. 1, wherein the panel comprises a panel surface with a frangible region and a remainder separated by a boundary having a non-zero width.
Figure 3B:
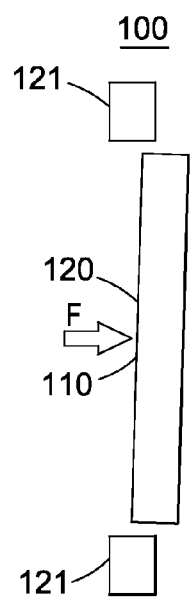
FIG. 3B is an exemplary detail drawing illustrating an embodiment of the panel of FIG. 3A, wherein when a force is applied to the panel, the boundary disintegrates, allowing the frangible region to break away from the remainder.
Figure 3C:
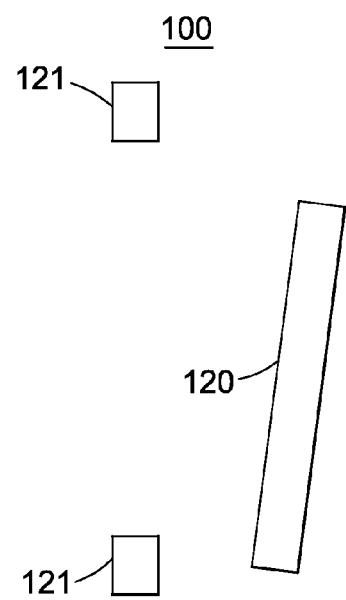
FIG. 3C is an exemplary detail drawing illustrating an embodiment of the panel of FIG. 3A, wherein the frangible region is detached separated from the remainder.

FIG. 3A is similar to FIG. 2A, except that a boundary 122 of FIG. 3A is shown as having a non-zero width. Turning to FIG. 3B, upon application of a force (F) on a panel surface 110 of a frangible region 120 of a panel 100, a boundary 122 region disintegrates, allowing the frangible region 120 to break away a the remainder 121 of the panel 100. In the aftermath of the application of a force (F) as illustrated in FIG. 3B, the frangible region 120 is intact and detached from the remainder 121 of the panel 100 as illustrated in FIG. 3C.

FIG. 4A is identical to FIG. 3A. However, turning to FIG. 4B, upon application of a force (F) on a panel surface 110 of a frangible region 120 of a panel 100, a boundary 122 region disintegrates into a spall 123, allowing the frangible region 120 to break away from a remainder 121 of the panel 100. In the aftermath of the application of the force (F) as illustrated in FIG. 4B, the frangible region 120 is intact and detached from the remainder 121 of the panel 100 as illustrated in FIG. 4C. As also illustrated in FIG. 4C, dispersion of the spall 123 is not controlled.

FIG. 5A is identical to FIG. 4A, except that a film 230 is applied to a panel surface 110 of a panel 100. The film 230 can comprise of one or more layers and can be disposed on the panel surface 110 via any conventional manner. Turning to FIG. 5B, upon application of a force (F) on a panel surface 110 of a frangible region 120 of a panel 100, a boundary 122 region disintegrates into a spall 123, allowing the frangible region 120 to break away from a remainder 121 of the panel 100 and stretching the film 230 around a film region 231. In the aftermath of the application of the force (F) as illustrated in FIG. 5B, the frangible region 120 is intact and detached from the remainder 121 of the panel 100 as illustrated in FIG. 5C. As also illustrated in FIG. 5C, dispersion of the spall 123 has been controlled by the film 230 that has itself torn, forming a film end 232.

Figure 6:
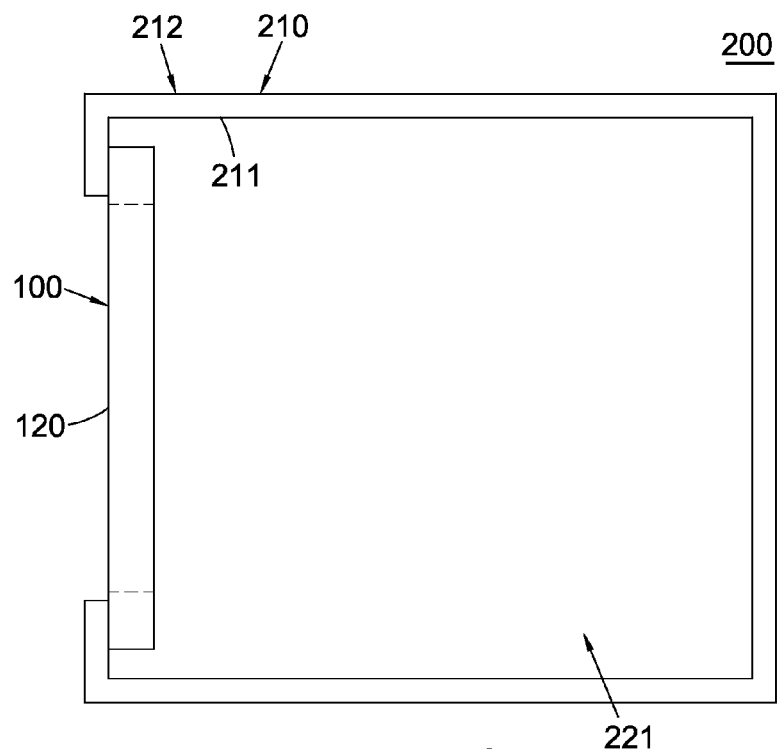
FIG. 6 is an exemplary top-level drawing illustrating an embodiment of a frangible panel assembly that includes the panel of FIG. 1 and a housing, wherein an inner surface of the housing partially encloses a chamber.

Turning to FIG. 6, a panel 100 can be advantageously incorporated into a frangible panel assembly 200, which further promotes the panel 100 breaking in a safe, predictable manner when a predetermined amount of force is applied to a frangible region 120 of the panel 100. An embodiment of the frangible panel assembly 200 includes a housing 210 with a wall 212. The panel 100 is coupled with an inner surface 211 of housing 210. The inner surface 211 of the housing 210 forms (and/or defines) a chamber 221 that may be partially enclosed. The panel 100 may be coupled with the inner surface 211 of the housing 210 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another.

Figure 7A:
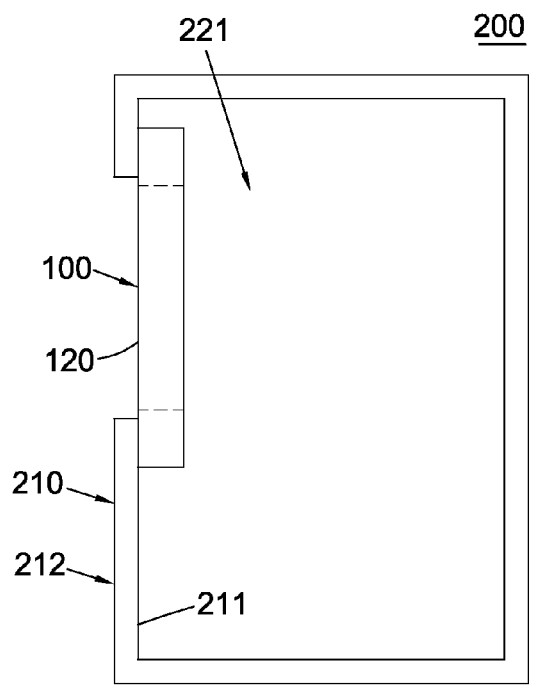
FIG. 7A is an exemplary detail drawing illustrating another embodiment of a frangible panel assembly that includes the panel of FIG. 1 and a housing, wherein an inner surface of the housing partially encloses a chamber with an extended height.
Figure 7B:
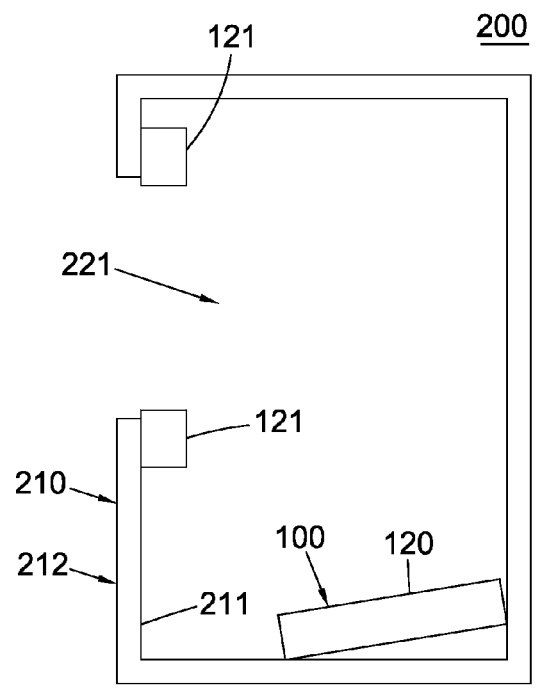
FIG. 7B is an exemplary detail drawing illustrating the frangible panel assembly of FIG. 7A, wherein a frangible region of the panel has separated from a remainder of the panel and receded into the chamber.

An alternative embodiment of a frangible panel assembly 200 is shown in FIG. 7A. Turning to FIG. 7A, the frangible panel assembly 200 includes a housing 210 with a wall 212. The panel 100 is coupled to an inner surface 211 of the housing 210 via any conventional manner as noted above. Compared to the chamber 221 of FIG. 6, the inner surface 211 of the housing 210 forms a chamber 221 of extended height that may also be partially enclosed. Turning to FIG. 7B, upon sufficient impact, the panel 100 may fail in a predictable manner, allowing the frangible region 120 to break away from the remainder 121 of the panel 100 and recede into the chamber 221.

Unlike prior art translucent panels that when struck shatter and/or form sharp shards that can injure nearby persons, the frangible region 120 can break away from the panel 100, preferably as an intact unit without internal fracturing.

Indeed, a panel exhibiting both translucence and impact safety is unexpected and addresses a long-felt need, particularly in the aviation industry with respect to video monitors.

Figure 8A:
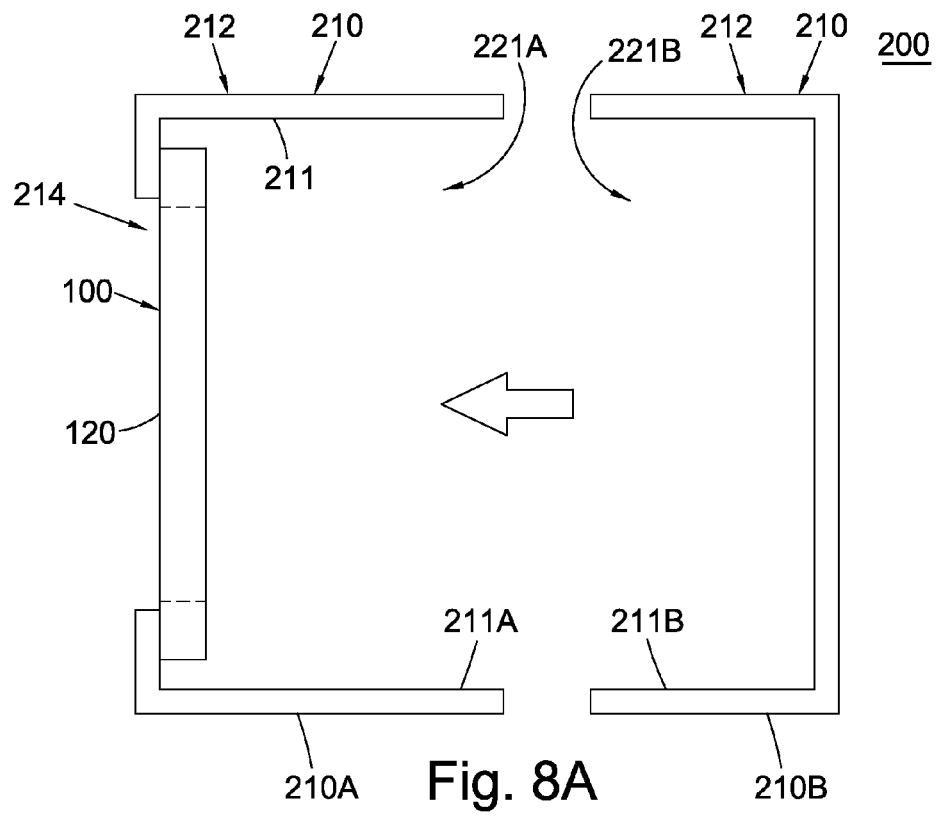
FIG. 8A is an exemplary detail exploded drawing illustrating another embodiment of the frangible panel assembly of FIG. 6, wherein the housing comprises a first housing member and a second housing member.
Figure 8B:
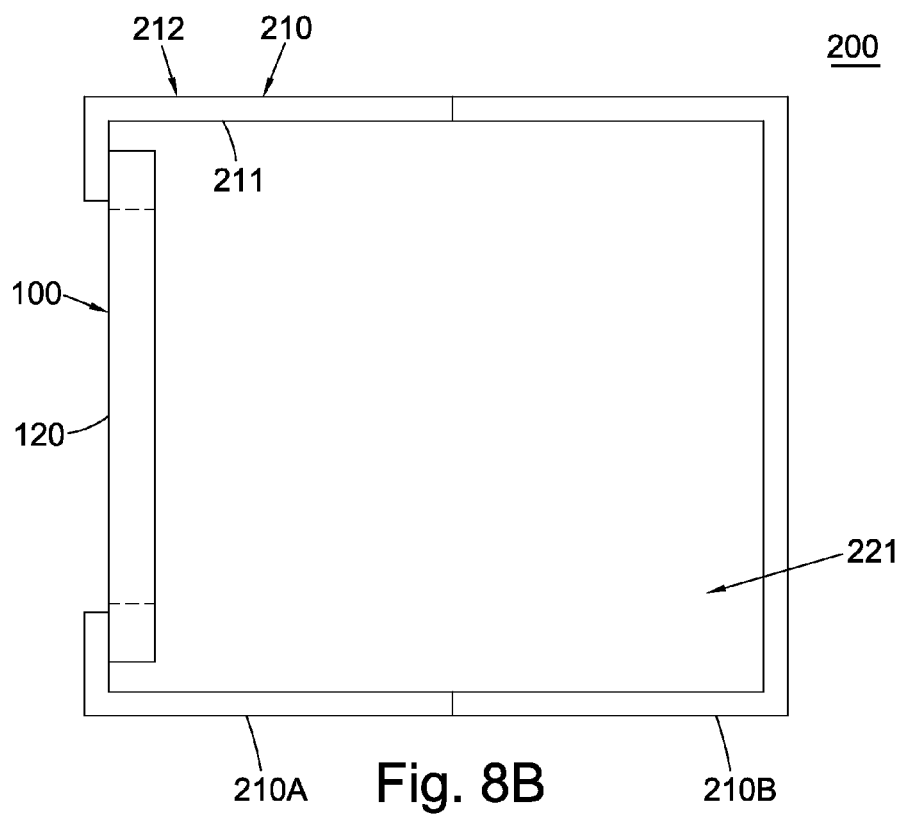
FIG. 8B is an exemplary detail drawing illustrating the frangible panel assembly of FIG. 8A, wherein a first housing member and a second housing member are coupled together.

Turning to FIG. 8A, another embodiment of a frangible panel assembly 200 includes a panel 100 with a frangible region 120 and a housing 210 with a wall 212. Here, the housing 210 may include a first housing member 210A and a second housing member 210B. The first housing member 221A has a wall 212 with a first inner surface 211A forming (and/or defining) a first chamber 221A with an opening 214 and that may otherwise be partially enclosed. The panel 100 is coupled to the first inner surface 211A of the first housing member via any conventional manner as noted above, closing the opening 214. The second housing member 210B has a wall 212 with a second inner surface 211B. The second inner surface 211B of the second housing member 210B forms (and/or defines) a second chamber 221B that may also be partially enclosed. As indicated in FIG. 8A, the first housing member 210A and the second housing member 210B can be coupled via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the first housing member 210A and the second housing member 210B relative to one another. Turning to FIG. 8B, the first housing member 210A and the second housing member 210B are coupled together such that the first inner surface 211A and second inner surface 211B align to form an inner surface 211 that defines (and/or forms) a chamber 221 that merges the first chamber 221A and the second chamber 221B.

Figure 9A:
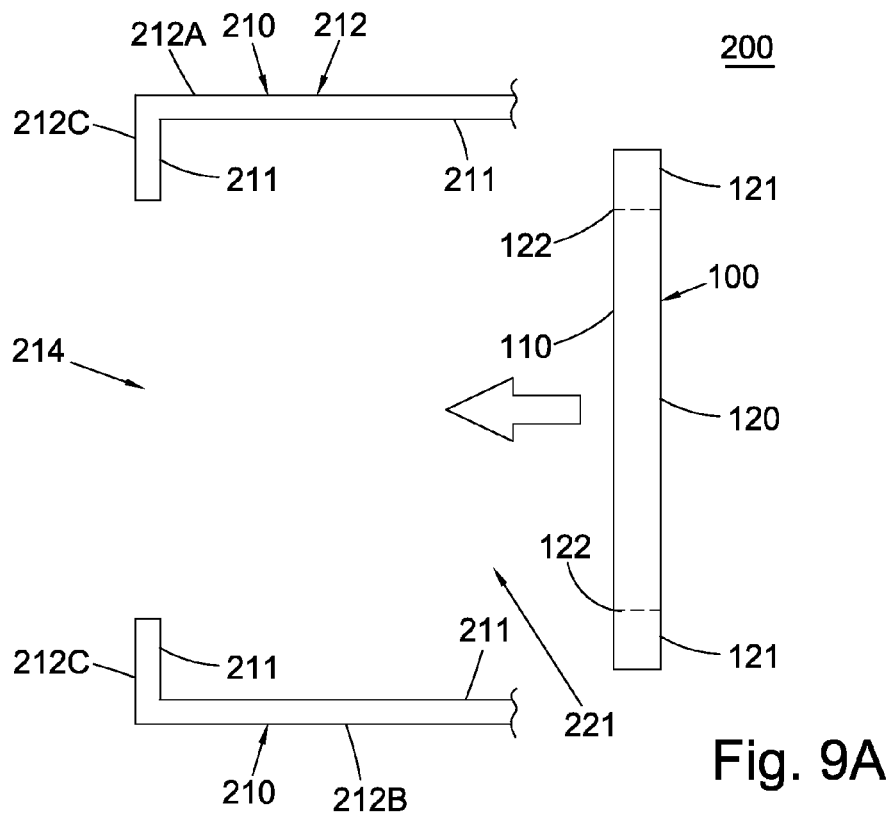
FIG. 9A is an exemplary detail exploded drawing illustrating a portion of an embodiment of a frangible panel assembly that includes the panel of FIG. 1.

Turning to FIG. 9A, a portion of a housing 210 of another embodiment of a frangible panel assembly 200 is shown separate from a panel 100 for greater clarity. As shown in FIG. 9A, the panel 100 has a panel surface 110 and further includes a boundary 122 separating a frangible region 120 from a remainder 122. The housing 210 has a wall 212 and an inner surface 211 that defines (and/or forms) a chamber 221 that may be partially enclosed. The housing 210 further includes a selected wall 212A with an inner surface 211 and an opposite wall 212B with an inner surface 211. Both the selected wall 212A and the opposite wall 212B each connect to a face wall 212C. The face wall 212C forms an opening 214 in the housing 212. As shown in FIG. 9A, the housing 210 is configured such that the panel surface 110 of the panel 100 may be coupled to the inner surface 211 of the face wall 212C of housing 210 via any convention manner as noted above, thereby closing the opening 214.

Figure 9B:
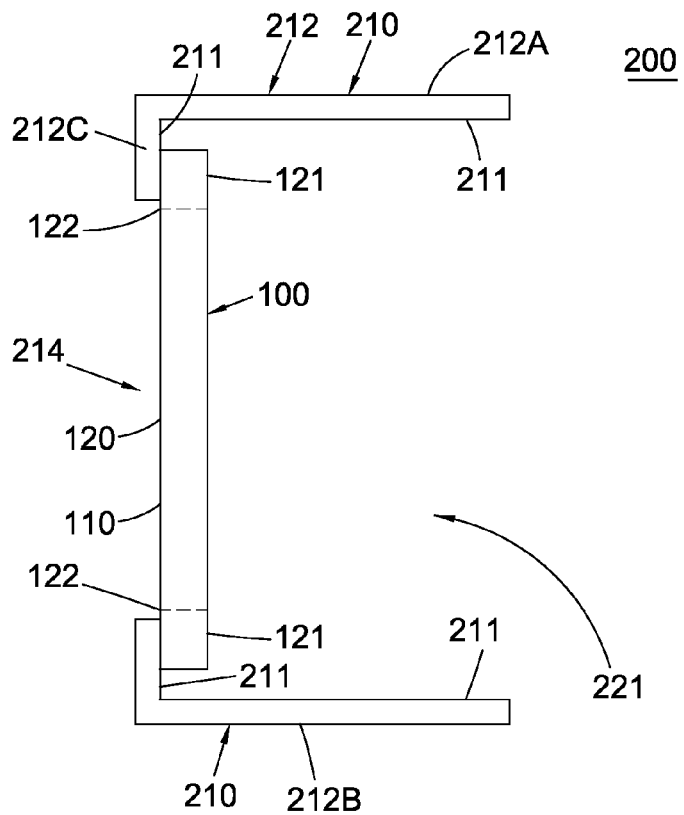
FIG. 9B is an exemplary detail drawing illustrating the frangible panel assembly of FIG. 9A, wherein a panel surface of a panel is coupled to an inner surface of a face wall of a housing.
Figure 9C:
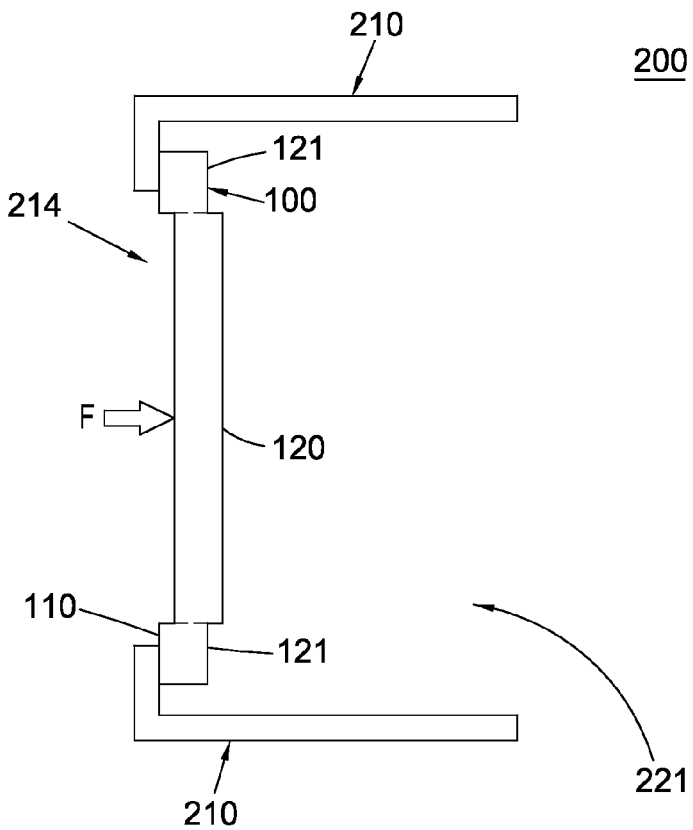
FIG. 9C is an exemplary detail drawing illustrating the frangible panel assembly of FIG. 9B, wherein when a force is applied to the panel, a boundary disintegrates, allowing a frangible region to break away from a remainder.
Figure 9D:
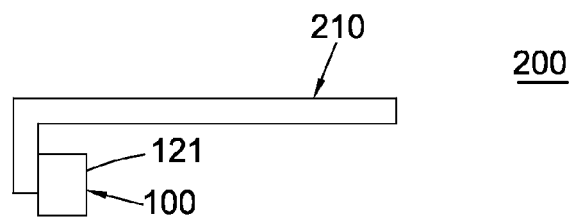
FIG. 9D is an exemplary detail drawing illustrating an embodiment of the panel of FIG. 9B, wherein a frangible region has receded into a chamber and is detached and separated from a remainder of the panel.
Figure 9D:
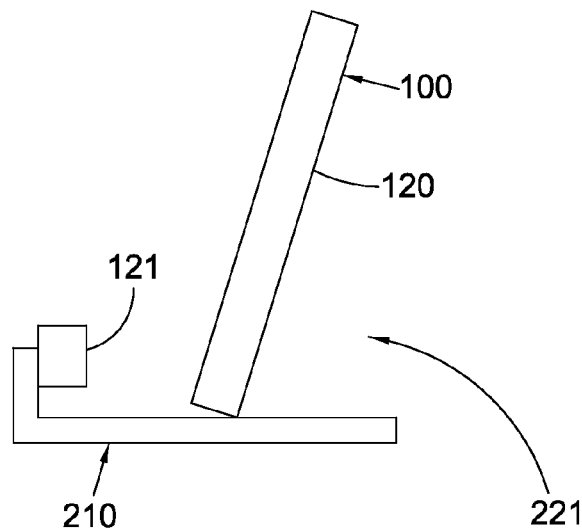

Turning to FIG. 9B, the panel 100 is shown as being coupled to the inner surface 211 of the face wall 212C of housing 210, thereby closing the opening 214. Specifically, a portion of the panel surface 110 covering the remainder 121 of the panel 100 is coupled to a portion of the inner surface 211 of the face wall 212. Upon application of a force (F) on a panel surface 110 of the frangible region 120 of the panel 100, the boundary 122 disintegrates, allowing the frangible region 120 to break away from the remainder 121 of the panel 100 as shown in FIG. 9C. In the aftermath of the application of the force (F) as illustrated in FIG. 9C, the frangible region 120 recedes into the chamber 221 and is intact and detached from the remainder 121 of the panel 100 as illustrated in FIG. 9D. Thus, unlike conventional systems, the frangible region 120 can break away from the panel 100, preferably as an intact unit without internal fracturing and recede safely into the chamber 221.

Figure 10A:
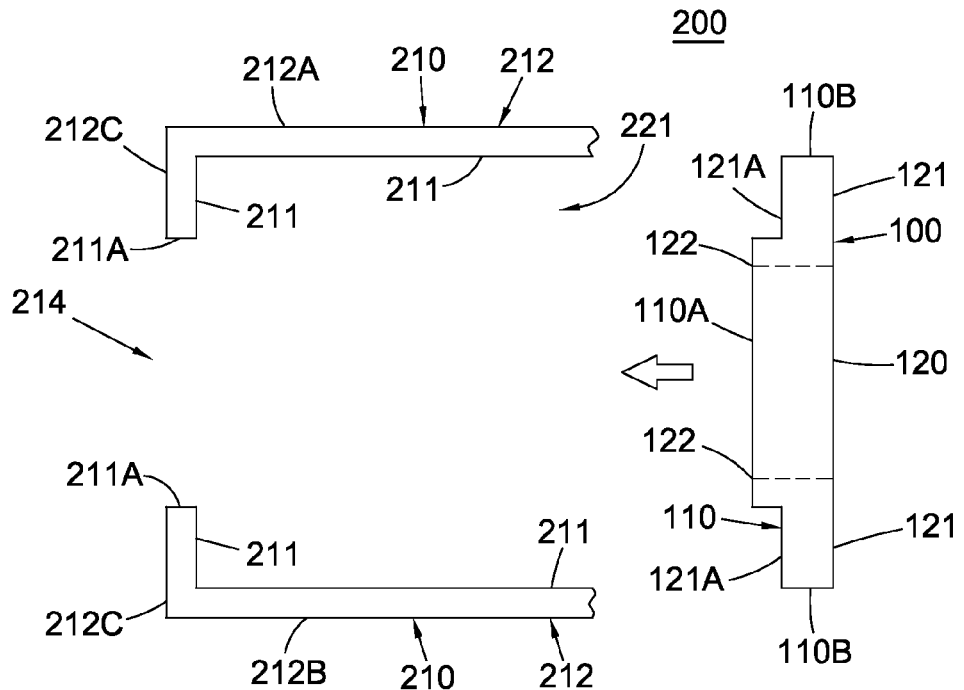
FIG. 10A is an exemplary detail exploded drawing illustrating a portion of another embodiment of a frangible panel assembly that includes the panel of FIG. 1 with an alternate shape.

Although shown as having a rectangular profile in FIG. 9A, a panel 100 may be provided with any conventional geometry. Turning to FIG. 10A, a portion of a housing 210 of another embodiment of a frangible panel assembly 200 is shown separate from a panel 100 for greater clarity. As shown in FIG. 10A, the panel 100 has a complex shape, wherein a panel surface 110 includes an indention 121A. The panel 100 further includes a boundary 122 separating a frangible region 120 from a remainder 122. The housing 210 has a wall 212 and an inner surface 211 that defines (and/or forms) a chamber 221 that may be partially enclosed. The housing 210 further includes a selected wall 212A with an inner surface 211 and an opposite wall 212B with an inner surface 211. Both the selected wall 212A and the opposite wall 212B each connect to a face wall 212C. The face wall forms an opening 214 in the housing 212 with an opening surface 211 surrounding the opening 214. As shown in FIG. 10A, the housing 210 is configured such that the panel surface 110 of the panel 100 may be coupled to the inner surface 211 and the opening surface 211A of the face wall 212C of housing 210 via any conventional manner as noted above, thereby closing the opening 214.

Figure 10B:
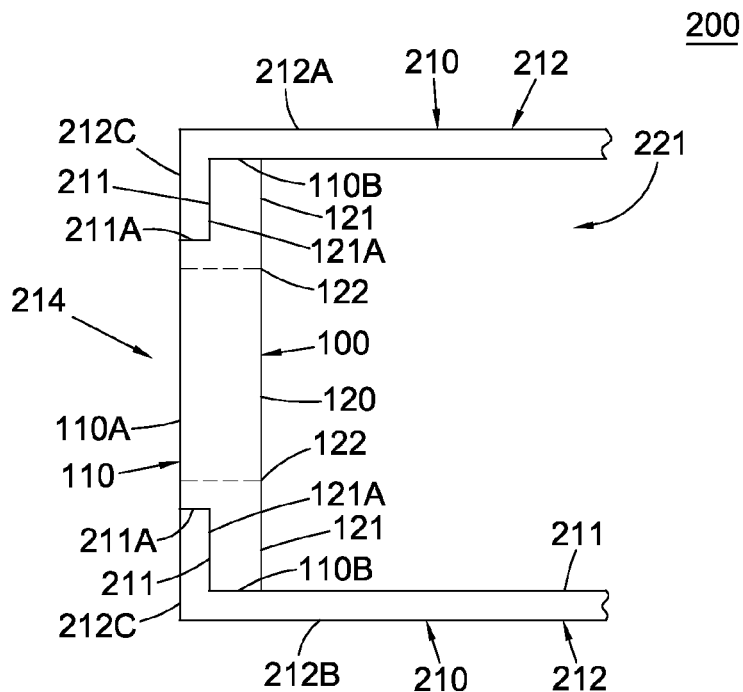
FIG. 10B is an exemplary detail drawing illustrating the frangible panel assembly of FIG. 10A, wherein a panel surface of a panel is coupled to an inner surface and an opening surface of a face wall of a housing and an end surface of the panel is coupled to an inner surface of a selected wall and an opposite wall of the housing.

Turning to FIG. 10B, the panel 100 with the indention 121A is shown as being coupled to the inner surface 211 and the opening surface 211A of the face wall 212C of housing 210, thereby closing the opening 214. Specifically, a portion of the panel surface 110 covering the remainder 121 of the panel 100 is coupled to the inner surface 211 and the opening surface 211A of the face wall 212. In addition, an end surface 110B of the panel 100 is also shown as being coupled to the inner surface 211 of the selected wall 212A and the opposite wall 212B. Furthermore, the panel surface of the panel 100 further includes an exposed surface 110A that is shown as being positioned flush to face wall 212C when the panel is coupled to the housing 210.

Figure 11A:
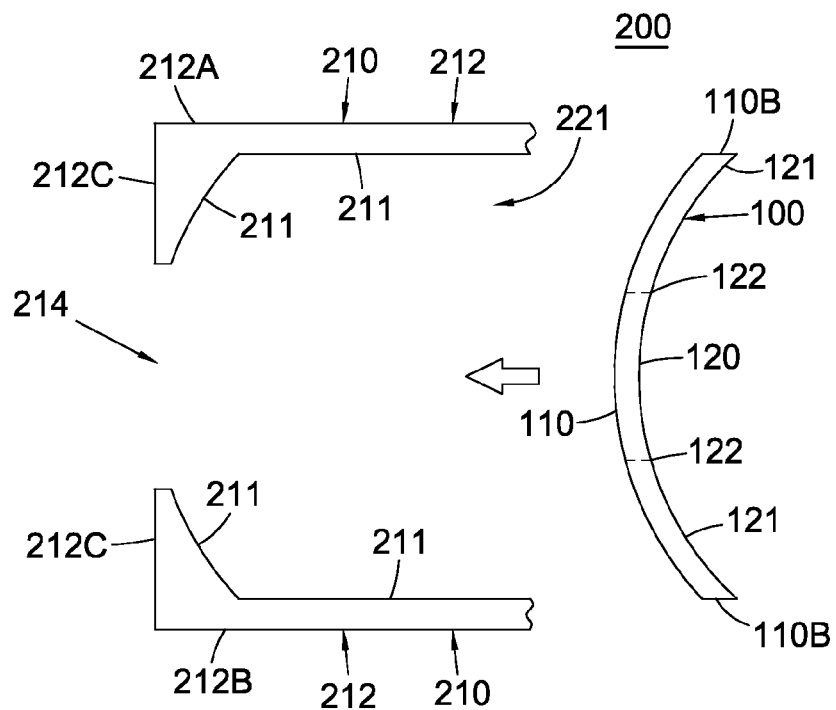
FIG. 11A is an exemplary detail exploded drawing illustrating a portion of another embodiment of a frangible panel assembly that includes the panel of FIG. 1 with an alternate convex shape.

Turning to FIG. 11A, a portion of a housing 210 of yet another embodiment of a frangible panel assembly 200 is again shown separate from a panel 100 for greater clarity. As shown in FIG. 11A, the panel 100 has a convex shape that forms a panel surface 110. The panel 100 further includes a boundary 122 separating a frangible region 120 from a remainder 122. The housing 210 has a wall 212 and an inner surface 211 that defines (and/or forms) a chamber 221 that may be partially enclosed. The housing 210 further includes a selected wall 212A with an inner surface 211 and an opposite wall 212B with an inner surface 211. Both the selected wall 212A and the opposite wall 212B each connect to a face wall 212C. The face wall forms an opening 214 in the housing 212 with an opening surface 211 surrounding the opening 214. As shown in FIG. 11A, the housing 210 is configured such that the panel surface 110 of the panel 100 may be coupled to the inner surface 211 and the opening surface 211A of the face wall 212C of housing 210 via any conventional manner as noted above, thereby closing the opening 214.

Figure 11B:
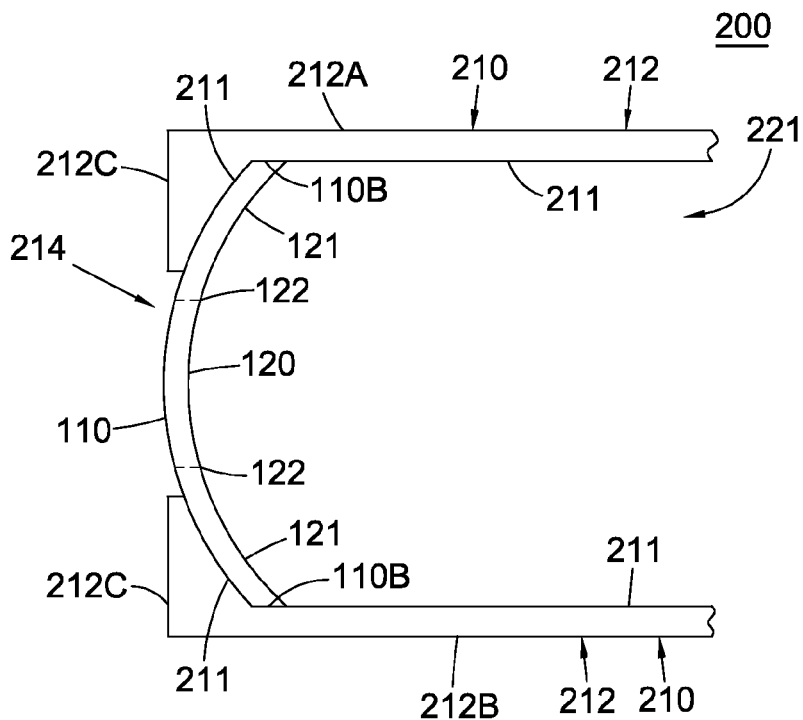
FIG. 11B is an exemplary detail drawing illustrating the frangible panel assembly of FIG. 11A, wherein a panel surface of a panel is coupled to an inner surface of a face wall of a housing and an end surface of the panel is coupled to an inner surface of a selected wall and an opposite wall of the housing.

Turning to FIG. 11B, the panel 100 is shown as being coupled to the inner surface 211 and the opening surface 211A of the face wall 212C of housing 210, thereby closing the opening 214. Specifically, a portion of the panel surface 110 covering the remainder 121 of the panel 100 is coupled to the inner surface 211 of the face wall 212. In addition, an end surface 110B of the panel 100 is also shown as being coupled to the inner surface 211 of the selected wall 212A and the opposite wall 212B.

Figure 12A:
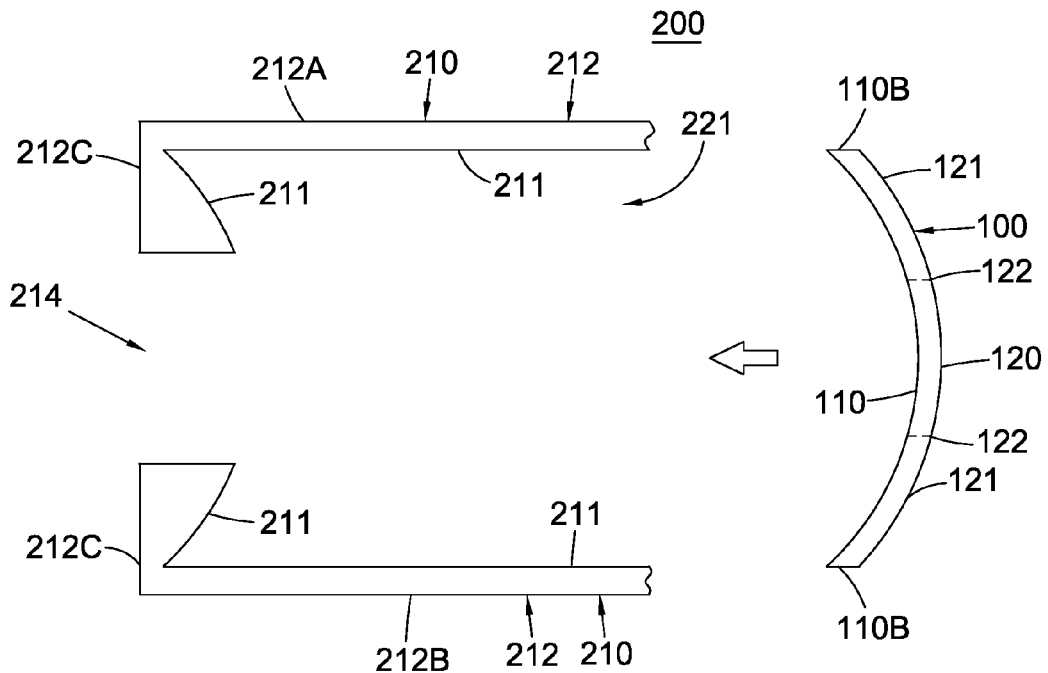
FIG. 12A is an exemplary detail exploded drawing illustrating a portion of another embodiment of a frangible panel assembly that includes the panel of FIG. 1 with an alternate concave shape.

Turning to FIG. 12A, a portion of a housing 210 of another embodiment of a frangible panel assembly 200 is again shown separate from a panel 100 for greater clarity. As shown in FIG. 12A, the panel 100 has a concave shape that forms a panel surface 110. The panel 100 further includes a boundary 122 separating a frangible region 120 from a remainder 122. The housing 210 has a wall 212 and an inner surface 211 that defines (and/or forms) a chamber 221 that may be partially enclosed. The housing 210 further includes a selected wall 212A with an inner surface 211 and an opposite wall 212B with an inner surface 211. Both the selected wall 212A and the opposite wall 212B each connect to a face wall 212C. The face wall forms an opening 214 in the housing 212 with an opening surface 211 surrounding the opening 214. As shown in FIG. 12A, the housing 210 is configured such that the panel surface 110 of the panel 100 may be coupled to the inner surface 211 and the opening surface 211A of the face wall 212C of housing 210, thereby closing the opening 214.

Figure 12B:
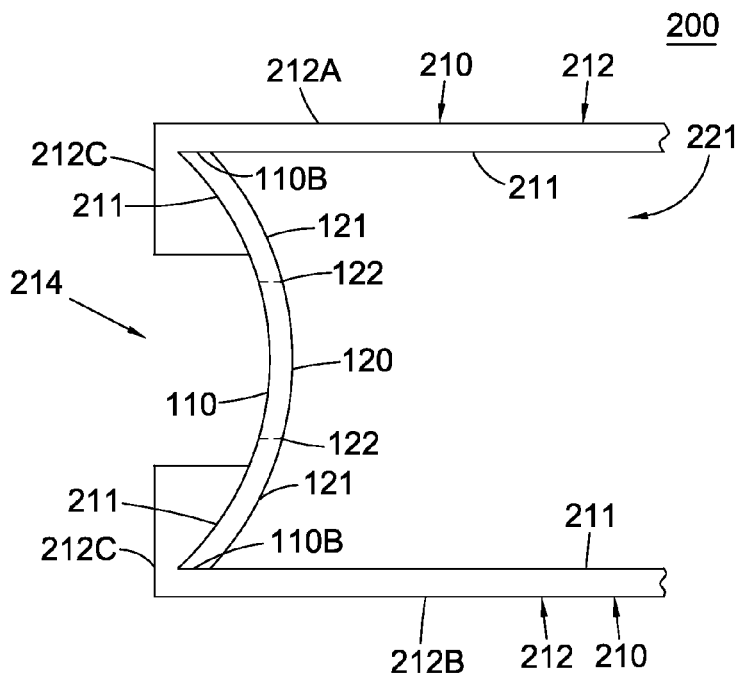
FIG. 12B is an exemplary detail drawing illustrating the frangible panel assembly of FIG. 12A, wherein a panel surface of a panel is coupled to an inner surface of a face wall of a housing and an end surface of the panel is coupled to an inner surface of a selected wall and an opposite wall of the housing.

Turning to FIG. 12B, the panel 100 is shown as being coupled to the inner surface 211 and the opening surface 211A of the face wall 212C of housing 210, thereby closing the opening 214. Specifically, a portion of the panel surface 110 covering the remainder 121 of the panel 100 is coupled to the inner surface 211 of the face wall 212. In addition, an end surface 110B of the panel 100 is also shown as being coupled to the inner surface 211 of the selected wall 212A and the opposite wall 212B.

Figure 13A:
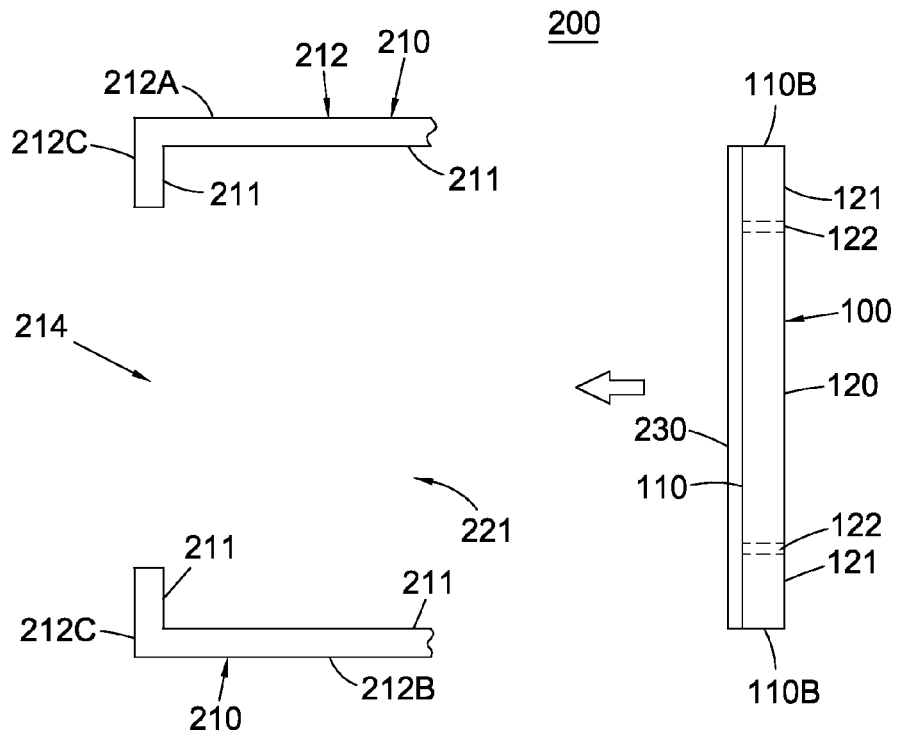
FIG. 13A is an exemplary detail exploded drawing illustrating a portion of an embodiment of a frangible panel assembly that includes the panel of FIG. 5A.

Turning to FIG. 13A, a portion of a housing 210 of another embodiment of a frangible panel assembly 200 is shown separate from a panel 100 for greater clarity. The panel 100 has a panel surface 110 and further includes a boundary 122 separating a frangible region 120 from a remainder 122. A film 230 is applied to a panel surface 110 of a panel 100. The film 230 can comprise of one or more layers and can be disposed on the panel surface 110 via any conventional manner. The housing 210 has a wall 212 and an inner surface 211 that defines (and/or forms) a chamber 221 that may be partially enclosed. The housing 210 further includes a selected wall 212A with an inner surface 211 and an opposite wall 212B with an inner surface 211. Both the selected wall 212A and the opposite wall 212B each connect to a face wall 212C. The face wall forms an opening 214 in the housing 212. As indicated in FIG. 13A, the housing 210 is configured such that the panel surface 110 of the panel 100 may be coupled to the inner surface 211 of the selected wall 212A and the opposite wall 212B of housing 210 via any conventional manner as noted above, thereby closing the opening 214.

Figure 13B:
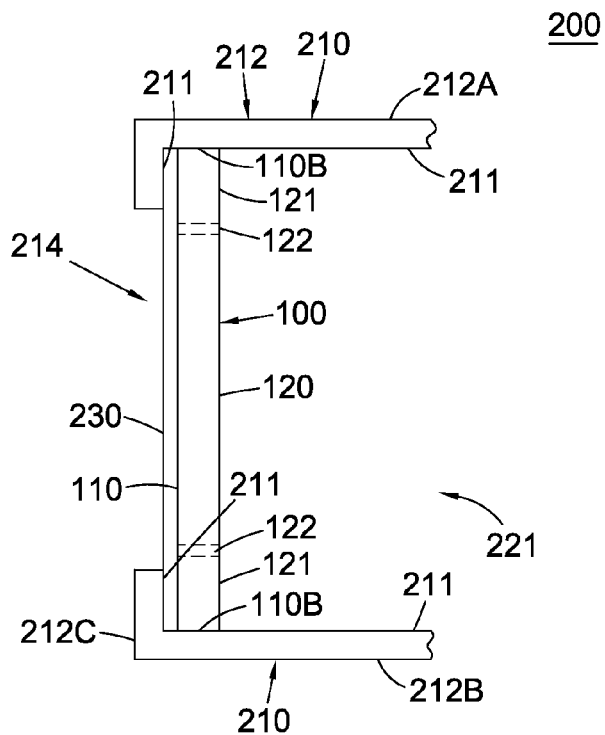
FIG. 13B is an exemplary detail drawing illustrating the frangible panel assembly of FIG. 13A, wherein an end surface of a panel is coupled to an inner surface of a face wall of a housing.

Turning to FIG. 13B, the panel 100 is shown as being coupled to the inner surface 211 of the selected wall 212A and the opposite wall 212B of housing 210, thereby closing the opening 214. Specifically, an end surface 110B of the panel 100 is shown as being coupled to the inner surface 211 of the selected wall 212A and the opposite wall 212B. In addition, a portion of the film 230 covering the remainder 121 of the panel 100 is coupled to the inner surface 211 of the face wall 212C. As will be discussed further, the coupling of the film 230 to the inner surface 211 of the facewall 212C may prevent delamination of the film 230 from the panel 100.

Figure 13C:
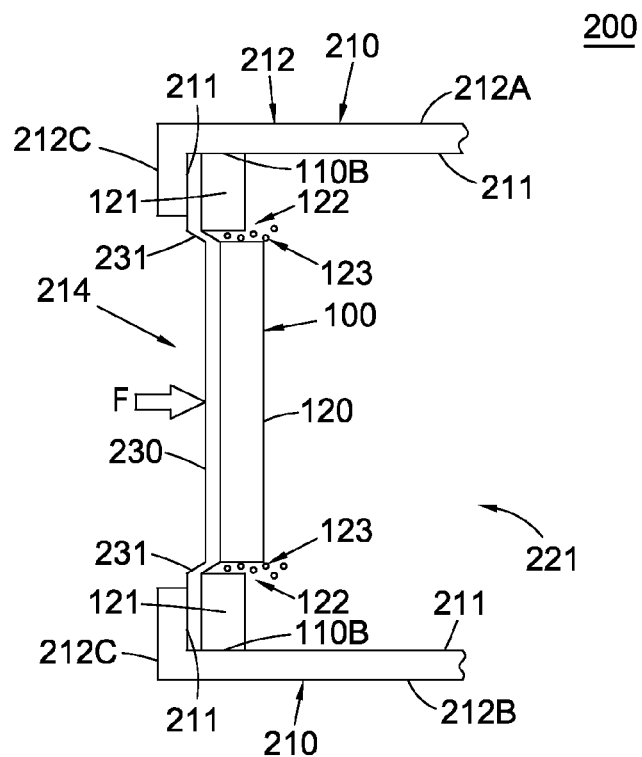
FIG. 13C is an exemplary detail drawing illustrating the frangible panel assembly of FIG. 13B, wherein when a force is applied to the panel, the boundary disintegrates into a spall, allowing the frangible region to break away from the remainder.
Figure 13D:
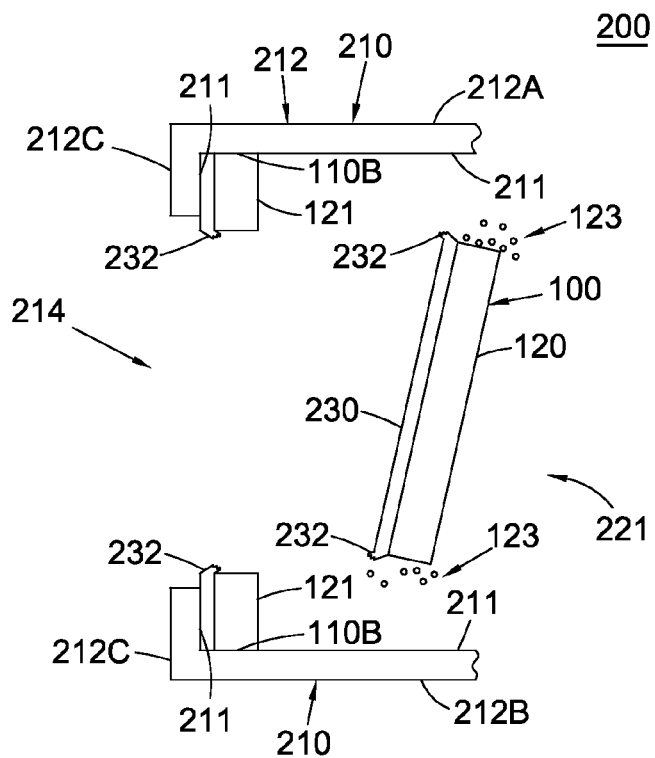
FIG. 13D is an exemplary detail drawing illustrating an embodiment of the panel of FIG. 13B, wherein a frangible region has receded into a chamber and is detached and separated from a remainder of the panel and the film has torn yet controlled dispersion of a spall.

Upon application of a force (F) on a panel surface 110 of the frangible region 120 of the panel 100, the boundary 122 disintegrates into a spall 123, allowing the frangible region 120 to break away from the remainder 121 of the panel 100 and stretching the film 230 around a film region 231 as shown in FIG. 13C. As mentioned previously, the coupling of the film 230 to the inner surface 211 of the facewall 212C may prevent delamination of the film 230 from the panel 100. In the aftermath of the application of the force (F) as illustrated in FIG. 13C, the frangible region 120 recedes into the chamber 221 and is intact and detached from the remainder 121 of the panel 100 as illustrated in FIG. 13D. As also illustrated in FIG. 13D, dispersion of the spall 123 has been controlled by the film 230 that has itself torn, forming a film end 232. Indeed, the spall 123 recedes safely into the chamber 221.

Unlike prior art translucent panel housings that when struck on the panel shatter and/or form sharp shards that can injure nearby persons, the frangible region 120 can break away from the panel 100, preferably as an intact unit without internal fracturing and recede safely into the chamber 221. Moreover, the film 230 controls dispersion of the spall 123, which also recedes safely into the chamber 221. A translucent panel housing with the aforementioned impact safety characteristics is unexpected and addresses a long-felt need, particularly in the aviation industry video monitors.

Figure 14A:
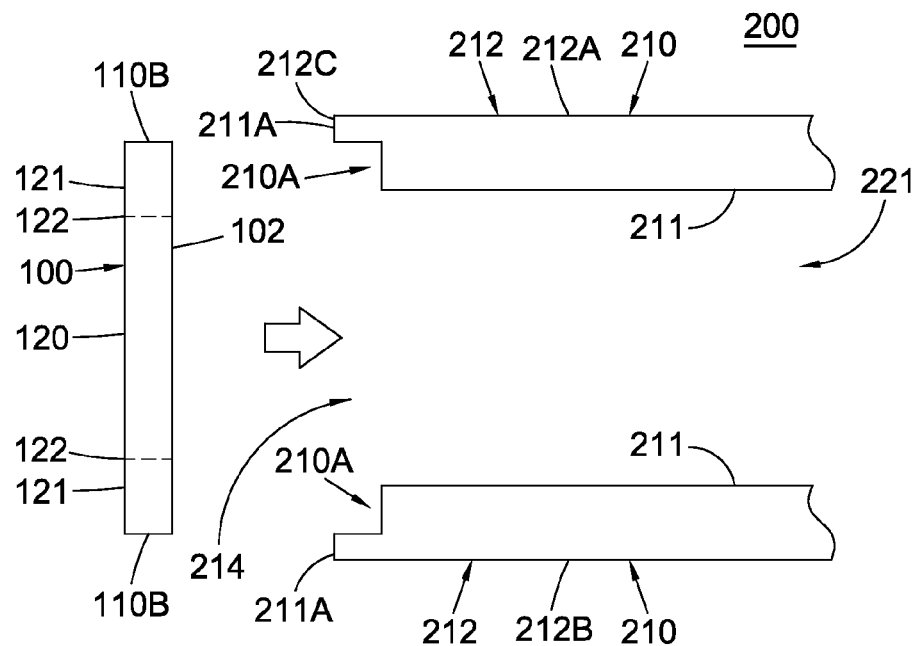
FIG. 14A is an exemplary detail exploded drawing illustrating a portion of another embodiment of a frangible panel assembly that includes the panel of FIG. 1, wherein the panel can be mounted such that a panel surface is flush to a face surface of a face wall of a housing.

Turning to FIG. 14A, for aesthetic, safety, and/or other reasons, it may be advantageous to provide a frangible panel assembly 200 with a panel 100 mounted flush to a face surface 211A of a housing 210. Specifically, a portion of a housing 210 of an embodiment of a frangible panel assembly 200 is shown separate from a panel 100 for greater clarity. As shown in FIG. 14A, the panel 100 has a panel surface 110, an end surface 110B and an internal surface 102. The panel 100 further includes a boundary 122 separating a frangible region 120 from a remainder 122. The housing 210 has a wall 212 and an inner surface 211 that defines (and/or forms) a chamber 221 with an opening 214. The housing 210 further includes a selected wall 212A with an inner surface 211 and an opposite wall 212B with an inner surface 211. Both the selected wall 212A and the opposite wall 212B each connect to a face wall 212C with a face surface 211A. The inner surface 211 further defines (and/or forms) a notched region 210A of the face wall 212C. As shown in FIG. 14A, the housing 210 is configured such that the end surface 110B and the internal surface 102 of the panel 100 may be coupled to the inner surface 211 of the notched region 210A of the face wall 212C, thereby closing the opening 214.

Figure 14B:
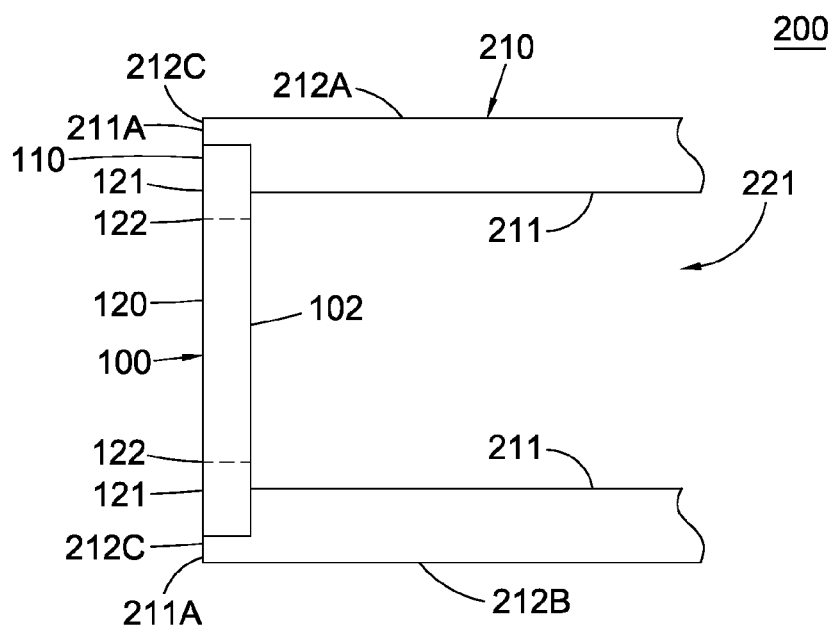
FIG. 14B is an exemplary detail drawing illustrating the frangible panel assembly of FIG. 14A, wherein a panel is coupled to a notched region of the housing such that the panel surface is flush with the face surface of the face wall of the housing.
Figure 14C:
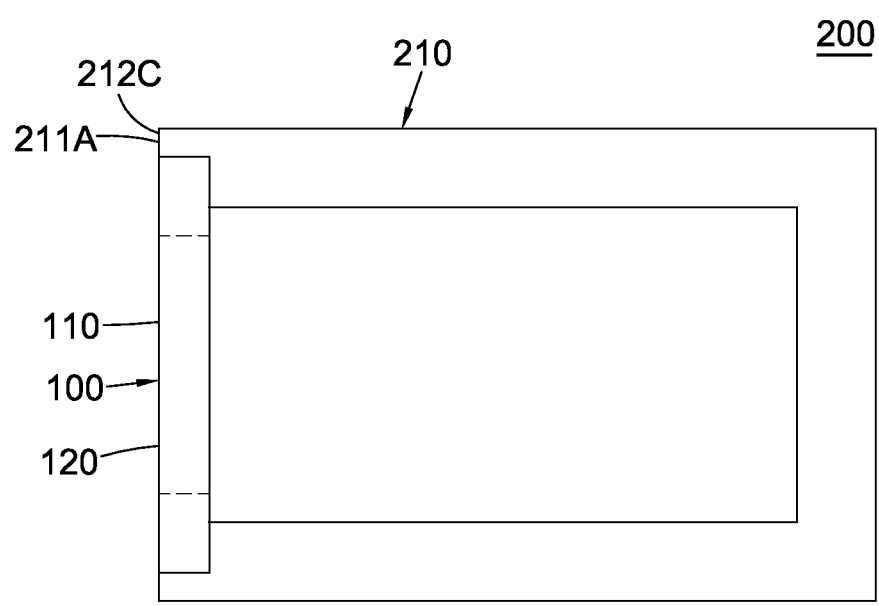
FIG. 14C is an exemplary detail drawing illustrating the frangible panel assembly of FIG. 14B, wherein the entire housing is shown.

Turning to FIG. 14B, the panel 100 is shown as being coupled to the inner surface 211 of the face wall 212C of housing 210, thereby closing the opening 214. The panel 100 may be coupled with the inner surface 211 of the housing 210 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another. Moreover, the panel surface 110 is shown as being flush to the face surface 211A of the face wall 212C of the housing 210. The entirety of the housing 210 is shown in FIG. 14C.

Figure 15A:
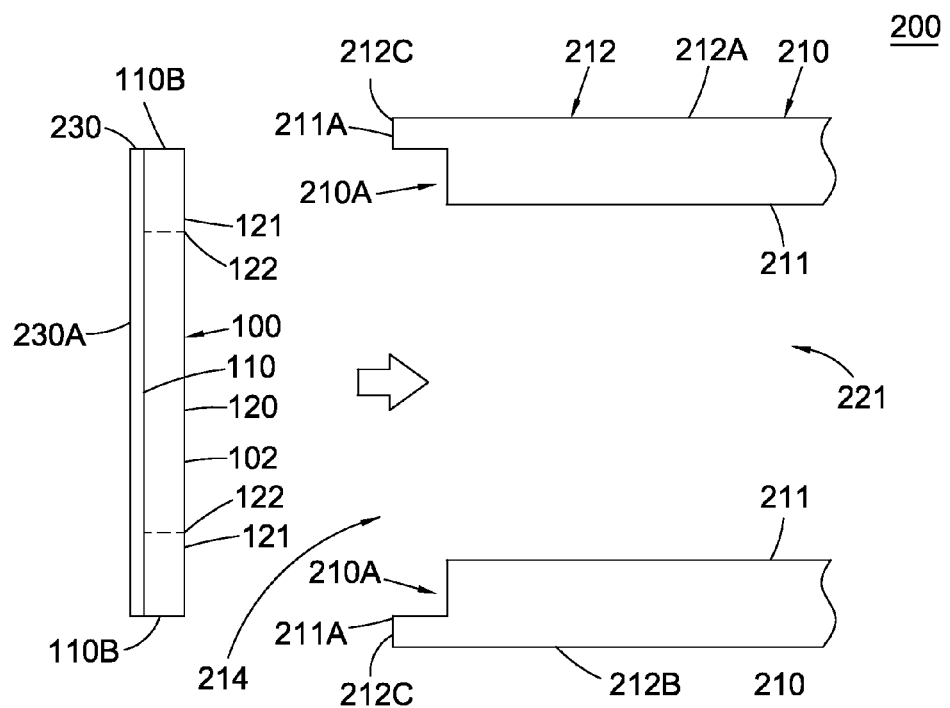
FIG. 15A is an exemplary detail exploded drawing illustrating a portion of another embodiment of a frangible panel assembly that includes the panel of FIG. 1 with a film applied thereto, wherein the panel can be mounted such that a film surface is flush to a face surface of a face wall of a housing.

Turning to FIG. 15A, for aesthetic, safety, and/or other reasons, it may be advantageous to provide a frangible panel assembly 200 with a panel 100 and a film 230 applied thereto, wherein the panel is mounted such that a film surface 230A is flush to a face surface 211A of a housing 210. Specifically, a portion of a housing 210 of another embodiment of a frangible panel assembly 200 is shown separate from a panel 100 for greater clarity. As shown in FIG. 15A, the panel 100 has a panel surface 110, an end surface 110B and an internal surface 102. A film 230 with a film surface 230A is applied to the panel surface 110. The panel 100 further includes a boundary 122 separating a frangible region 120 from a remainder 122. The housing 210 has a wall 212 and an inner surface 211 that defines (and/or forms) a chamber 221 with an opening 214 and that may otherwise be partially enclosed. The housing 210 further includes a selected wall 212A with an inner surface 211 and an opposite wall 212B with an inner surface 211.

Both the selected wall 212A and the opposite wall 212B each connect to a face wall 212C with a face surface 211A. The inner surface 211 further defines (and/or forms) a notched region 210A of the face wall 212C. As shown in FIG. 14A, the housing 210 is configured such that the end surface 110B and the internal surface 102 of the panel 100 may be coupled to the inner surface 211 of the notched region 210A of the face wall 212C, thereby closing the opening 214. The panel 100 may be coupled with the inner surface 211 of the housing 210 via any conventional manner as noted above.

Figure 15B:
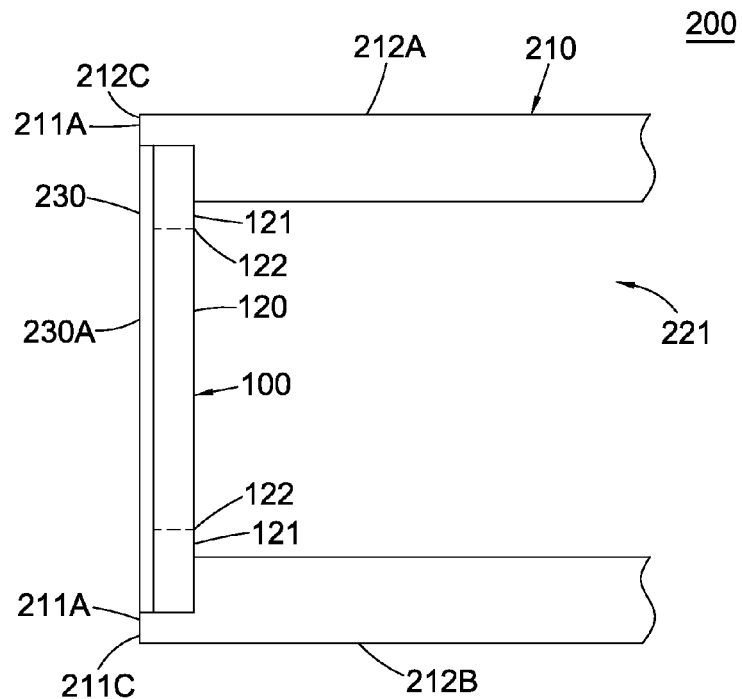
FIG. 15B is an exemplary detail drawing illustrating the frangible panel assembly of FIG. 15A, wherein the panel is coupled to a notched region of the housing such that the film surface is flush with the face surface of the face wall of the housing.

Turning to FIG. 15B, the panel 100 is shown as being coupled to the inner surface 211 of the face wall 212C of housing 210, thereby closing the opening 214. The panel 100 may be coupled with the inner surface 211 of the housing 210 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another. Moreover, the film surface 230A is shown as being flush to the face surface 211A of the face wall 212C of the housing 210.

Figure 16A:
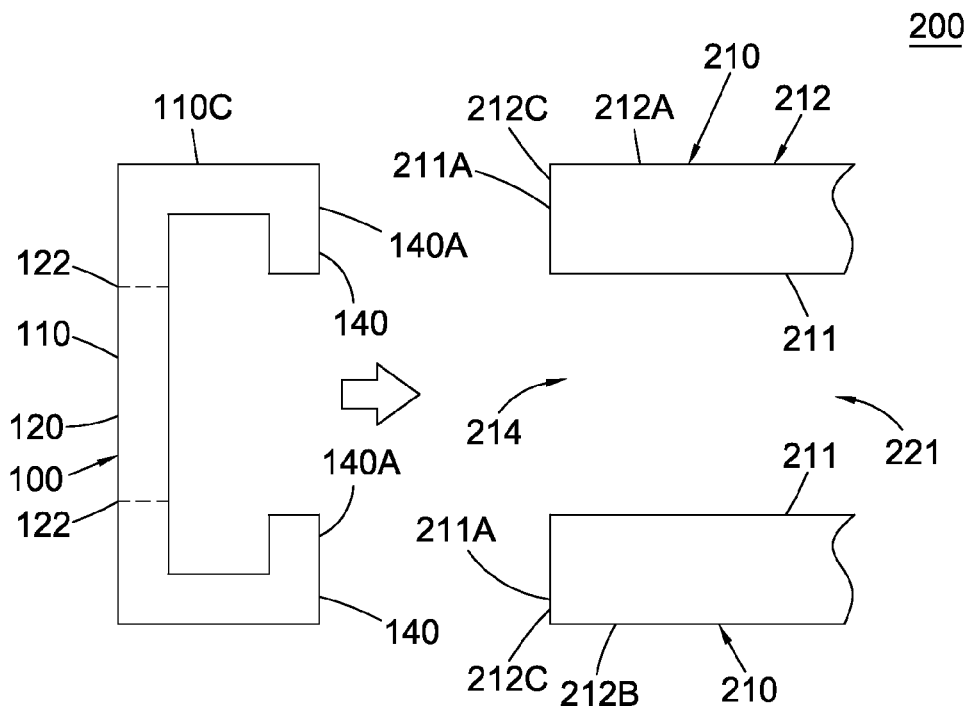
FIG. 16A is an exemplary detail exploded drawing illustrating a portion of another embodiment of a frangible panel assembly that includes the panel of FIG. 1 with an alternate C-shaped cross-section.

Turning to FIG. 16A, a portion of a housing 210 of another embodiment of a frangible panel assembly 200 is shown separate from a panel 100 for greater clarity. As shown in FIG. 16A, the panel 100 has a C-shaped cross-section. Panel 100 includes a panel surface 110 and a panel region 140 with a mounting surface 140A. The panel 100 further includes a boundary 122 separating a frangible region 120 from a remainder 122. Panel 100 may be formed using any one or more conventional processes such as Thermal Sheet Molding by GPInnvation GmbH of Potsdam, Germany. The housing 210 has a wall 212 and an inner surface 211 that defines (and/or forms) a chamber 221 with an opening 214 and that may be partially enclosed. The housing 210 further includes a selected wall 212A with an inner surface 211 and an opposite wall 212B with an inner surface 211. Both the selected wall 212A and the opposite wall 212B each connect to a face wall 212C with a face surface 211A. As shown in FIG. 14A, the housing 210 is configured such that the mounting surface 140A of the panel region 140 of the panel 100 may be coupled to the face surface 211A of the face wall 212C, thereby enclosing the opening 214.

Figure 16B:
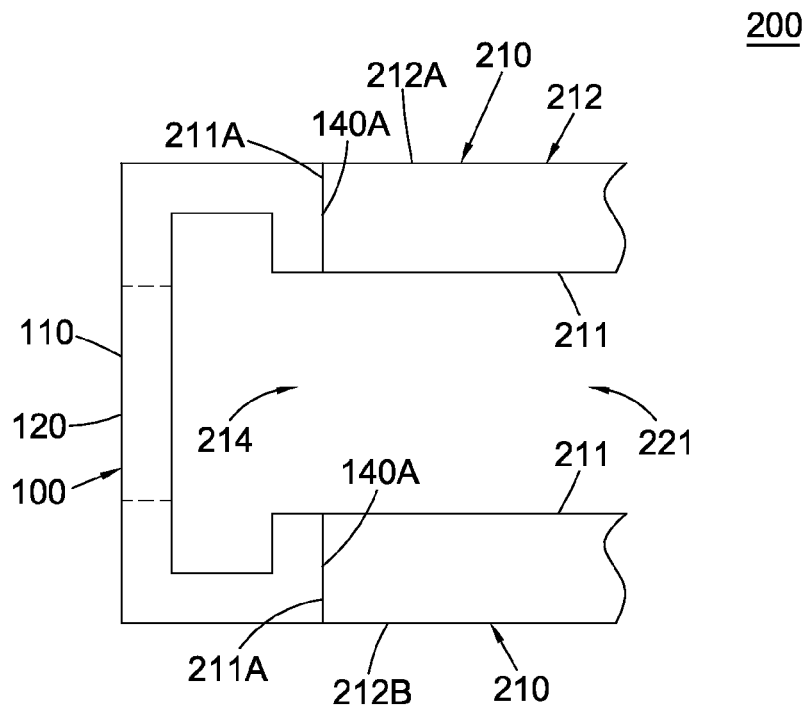
FIG. 16B is an exemplary detail drawing illustrating the frangible panel assembly of FIG. 16A, wherein a mounting surface of a panel region of the panel is coupled to a face surface of a face wall of a housing.

Turning to FIG. 16B, the panel 100 is shown as being coupled to the face surface 211A of the face wall 212C of housing 210, thereby enclosing the opening 214. The panel 100 may be coupled with the face surface 211A of the housing 210 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another. Moreover, the mounting surface 110 is shown as being coextensive with the face surface 211A of the face wall 212C of the housing 210.

Figure 17A:
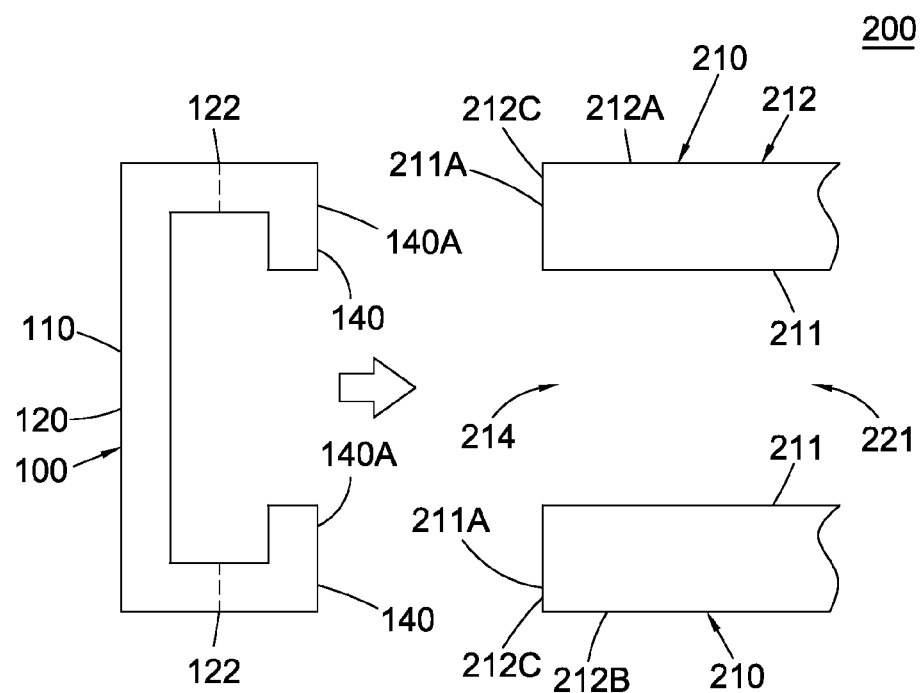
FIG. 17A is an exemplary detail exploded drawing illustrating a portion of another embodiment of the frangible panel assembly of FIG. 16A that includes a panel with an alternate boundary placement.
Figure 17B:
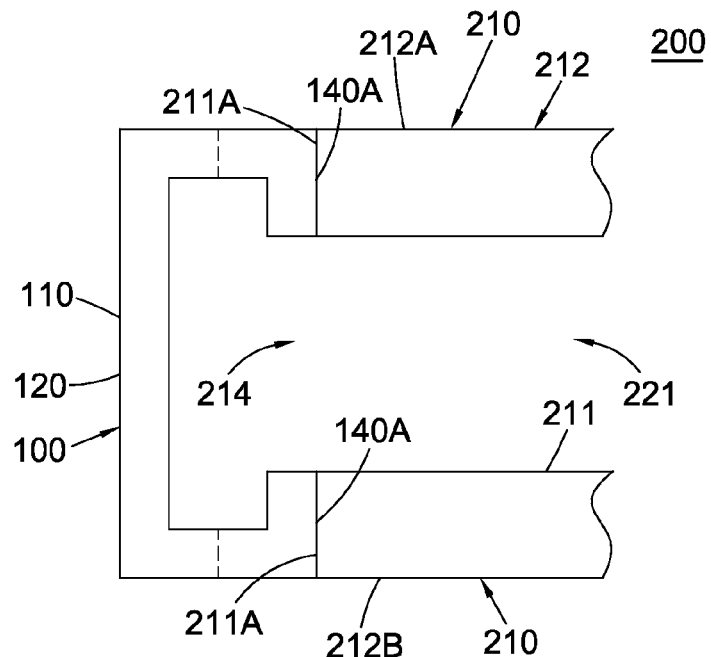
FIG. 17B is an exemplary detail drawing illustrating the frangible panel assembly of FIG. 17A, wherein a mounting surface of a panel region of the panel is coupled to a face surface of a face wall of a housing.

Turning to FIG. 17A, a portion of a housing 210 of another embodiment of a frangible panel assembly 200 is shown separate from a panel 100 for greater clarity. As shown in FIG. 17A, the panel 100 is identical to the panel 100 shown in FIG. 16A, except for a boundary 122 with an alternate placement closer to a panel region 140. Similarly, a housing 210 is identical to the housing 210 shown in FIG. 16A. Turning to FIG. 17B, a frangible panel assembly 200 is shown as being identical to the frangible panel assembly 200 of FIG. 16B, except for the alternate placement of the boundary 122 of panel 100 as described with respect to FIG. 17A.

Figure 18A:
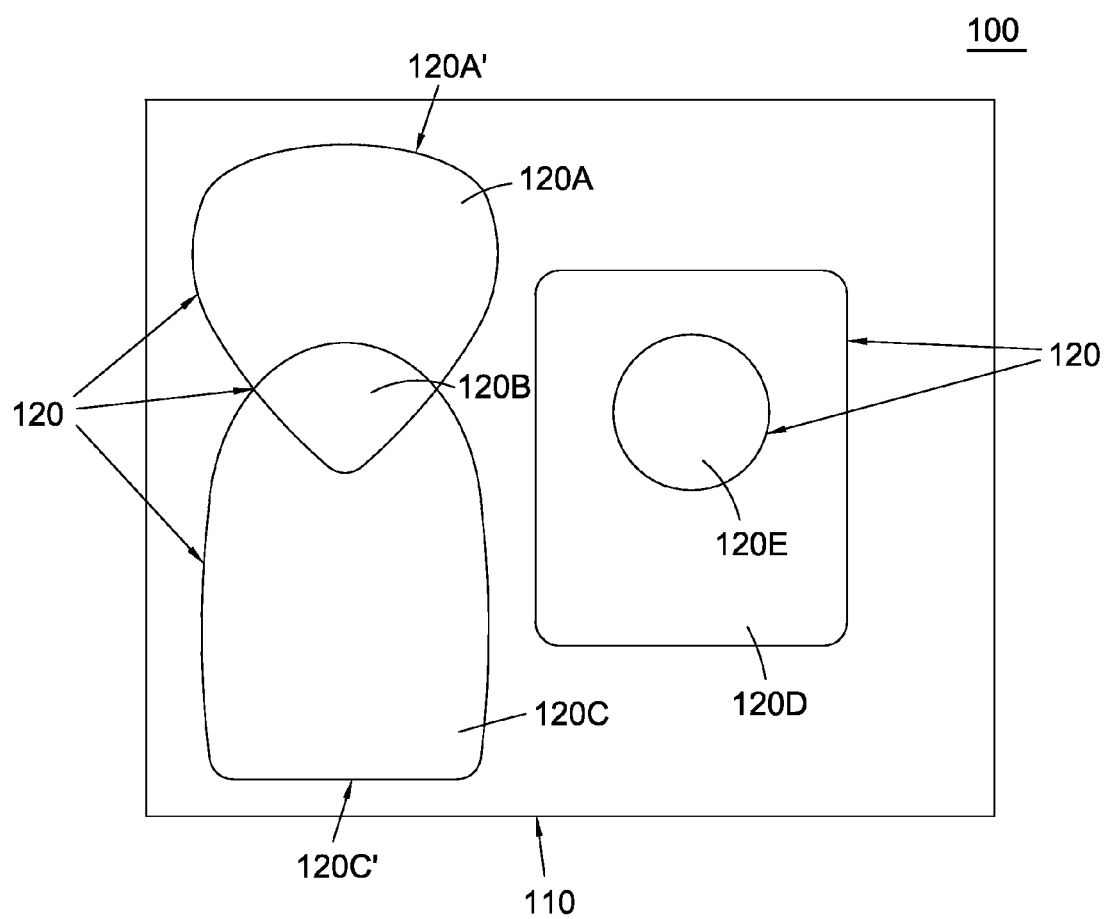
FIG. 18A is an exemplary detail drawing illustrating an embodiment of the panel of FIG. 1, wherein the panel comprises a panel surface with a plurality of frangible regions.

An alternative embodiment of the panel 100 of FIG. 1 is shown in FIG. 18A. Although the panel 100 can be formed from any conventional panel material, including opaque panel materials, the panel 100, in this embodiment, advantageously can be formed from a hard, translucent material, such as glass or polycarbonate. Turning to FIG. 18A, the panel 100 is illustrated as being formed with predetermined dimensions and having at least one frangible region 120 disposed thereon. The panel 100 of FIG. 18A is illustrated as having five frangible regions 120A-E each having a selected shape, size, and/or location. The frangible regions 120A-E are shown as having different shapes, sizes, and locations for purposes of illustration only. As desired, a selected frangible region 120 can be provided with a selected dimension and/or geometry and can overlap another frangible region 120. As illustrated in FIG. 18A, a first frangible region 120A' partially overlaps a second frangible region 120C', thereby defining and/or bounding the three frangible regions 120A-C. As further illustrated in FIG. 18A, the frangible region 120D concentrically overlaps the frangible region 120E. Advantageously, the frangible regions 120A-E each enable the panel 100 to break in a predetermined manner if impacted with sufficient force. For example, the frangible region 120E enables the remainder of the panel 100 to remain intact if the panel 100 is impacted with sufficient force only on the frangible region 120E.

Figure 18B:
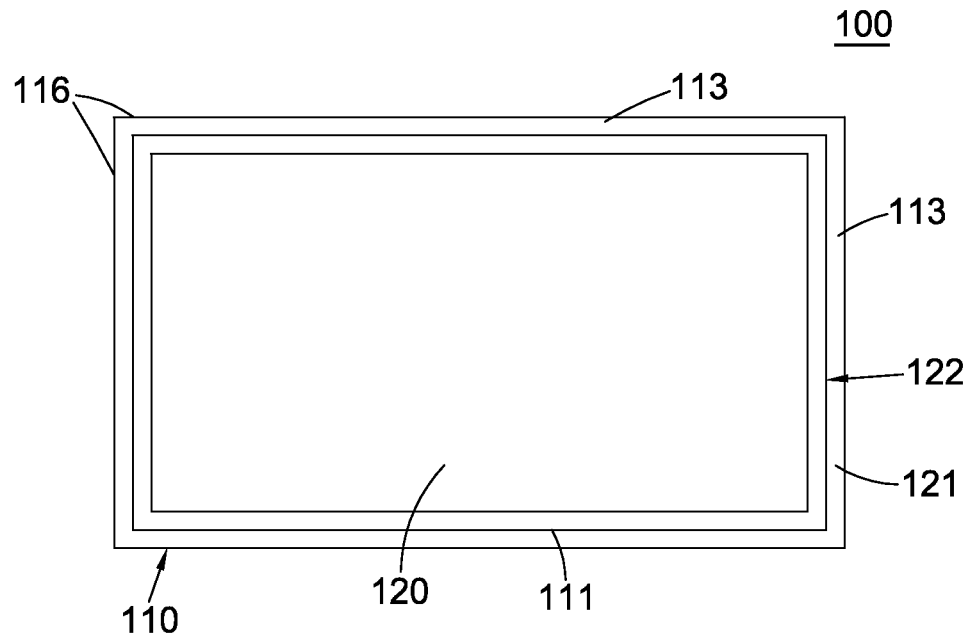
FIG. 18B is an exemplary detail drawing illustrating an alternative embodiment of the panel of FIG. 1, wherein the panel comprises a panel surface with a frangible region defined and/or bounded by a notch.

The frangible region 120 can be defined and/or bounded via any conventional manner. In one embodiment, for example, the selected frangible region 120 can be defined and/or bounded by a notch 111 that forms a boundary 122 between the frangible region 120 and a remainder 121 as illustrated in FIG. 18B. Turning to FIG. 18B, the notch 111 is shown as being formed in continuous or contiguous pattern within a perimeter region 113 of the panel 100. Although shown as having a contour that conforms with a contour 116 of the panel 100 for purposes of illustration only, the notch 111 can be provided with any conventional geometry.

Figure 18C:
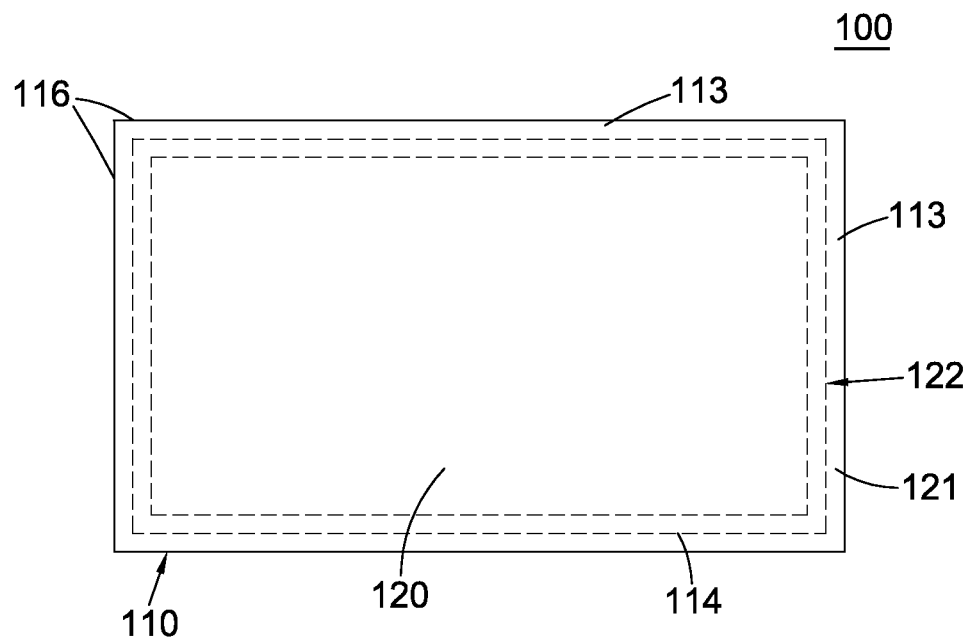
FIG. 18C is an exemplary detail drawing illustrating an alternative embodiment of the panel of FIG. 1, wherein the panel comprises a panel surface with a frangible region defined and/or bounded by a locally limited stress gradient.

Additionally and/or alternatively, the frangible region 120 can be defined and/or bounded via a locally limited stress gradient region 114 that forms a boundary 122 between the frangible region 120 and a remainder 121 as illustrated in FIG. 18C. The locally limited stress gradient region 114 can be a region of the panel 100 with an inhomogeneous stress state. Turning to FIG. 18C, the locally limited stress gradient 114 is shown as being formed in continuous pattern within the perimeter region 113 of the panel 100. Although shown as having a contour that conforms with the contour 116 of the panel 100 for purposes of illustration only, the locally limited stress gradient 114 can be provided with any conventional geometry.

Figure 19A:
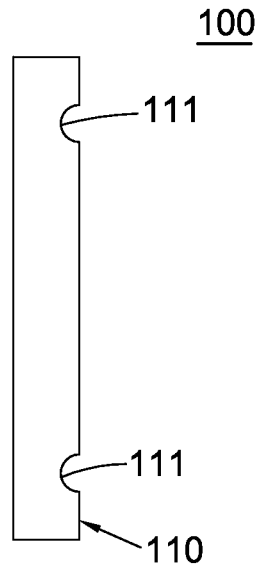
FIG. 19A is an exemplary detail drawing illustrating an embodiment of the panel of FIG. 18B, wherein the notch is formed with a semi-circular profile.
Figure 19B:
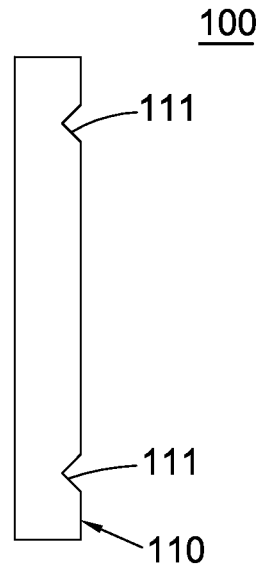
FIG. 19B is an exemplary detail drawing illustrating an alternative embodiment of the panel of FIG. 18B, wherein the notch is formed with a triangular profile.
Figure 19C:
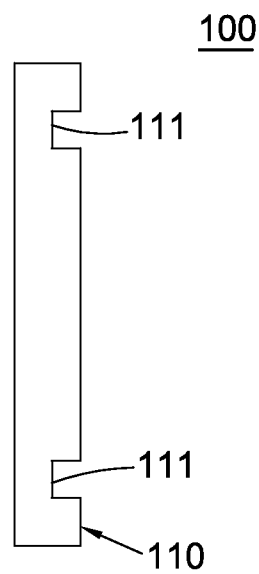
FIG. 19C is another exemplary detail drawing illustrating another alternative embodiment of the panel of FIG. 18B, wherein the notch is formed with a rectangular profile.

FIGS. 19A-C illustrate exemplary cut-away side views of panel 100 with the notch 111. While the notch 111 is shown as being alternatively semi-circular, triangular, and rectangular in these figures for purposes of illustration only, the notch 111 may be formed with any conventional cross-sectional geometry. The depth and width of the notch 111 can vary and can comprise any suitable value. In one embodiment, the notch 111 can have a depth of up to approximately 0.1 mm or more and/or a width of up to approximately 0.87 mm or more.

As desired, the depth and width of notch 111 can be independently established as a preselected percentage (and/or a preselected percentage range) of the maximum depth and width, respectively, of the notch 111. Exemplary preselected percentage ranges can include between fifty percent (50%) and one hundred percent (100%) of the maximum depth and/or width of notch 111, including any percentage sub-ranges, such as a five percent sub-range (i.e., between sixty-five percent (65%) and seventy percent (70%)) and/or a ten percent sub-range (i.e., between sixty percent (60%) and seventy percent (70%)), within the preselected percentage range, without limitation. As set forth above, the numerical values set cited throughout this specification are intended for purposes of illustration only and not for purposes of limitation.

Figure 20:
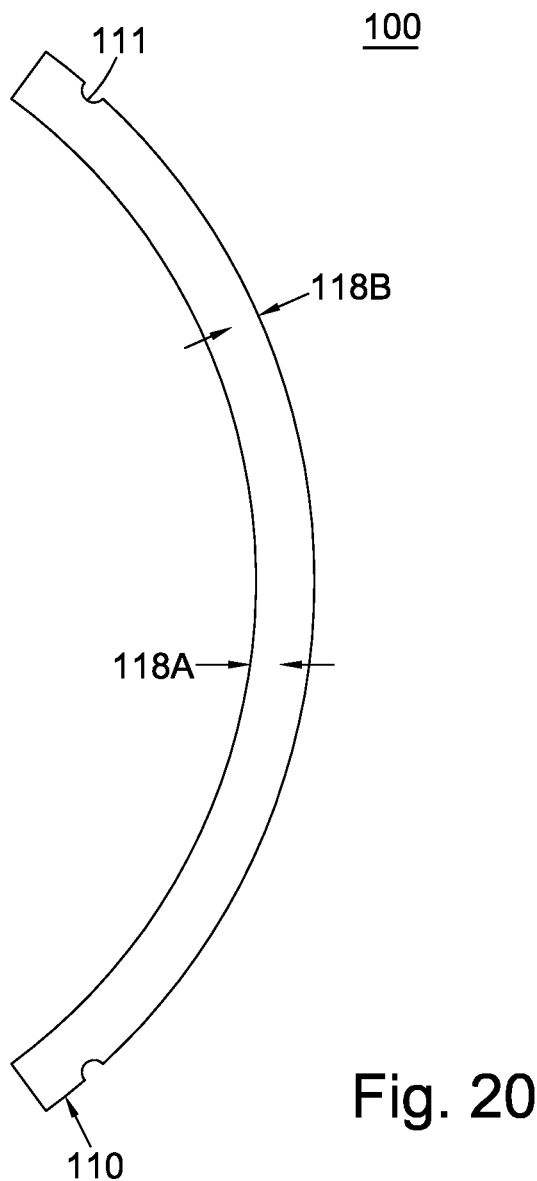
FIG. 20 is an exemplary detail drawing illustrating an embodiment of the panel of FIG. 18B, wherein the panel has curved surfaces.

Turning to FIG. 20, in an embodiment where panel 100 has curved surface regions 118A and 118B in compression and tension, respectively, it is preferable for notch 111 to be disposed on the curved surface region in tension 118B. Panel 100 may be formed using any one or more conventional processes such as Thermal Sheet Molding by GPInnvation GmbH of Potsdam, Germany.

Figure 21A:
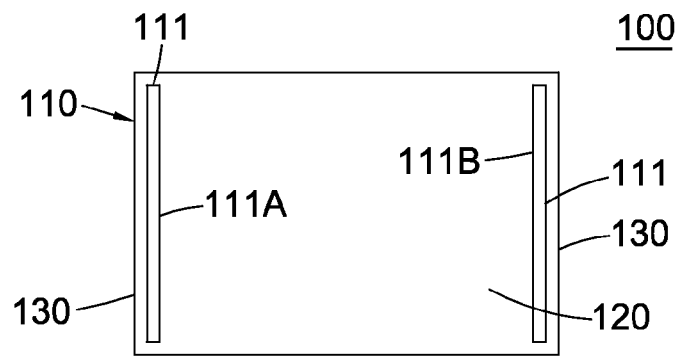
FIG. 21A is an exemplary detail drawing illustrating another alternative embodiment of the panel of FIG. 1, wherein the panel comprises a panel surface with a frangible region defined and/or bounded by a pair of notches formed adjacent to opposite sides of the panel.
Figure 21B:
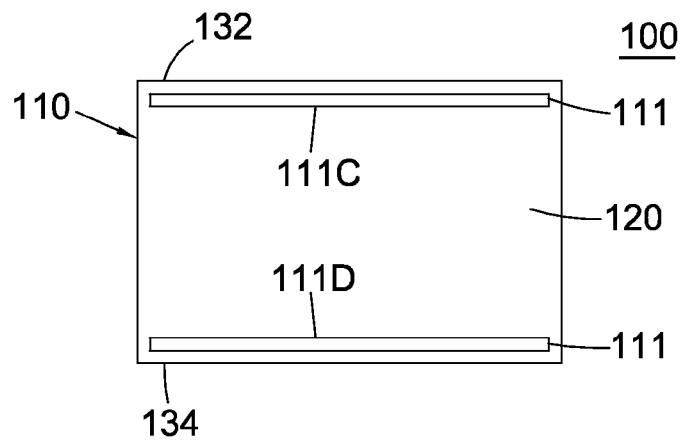
FIG. 21B is another exemplary detail drawing illustrating an alternative embodiment of the panel of FIG. 1, wherein the panel comprises a panel surface with a frangible region defined and/or bounded by a pair of notches formed adjacent to the top and bottom of the panel.
Figure 21C:
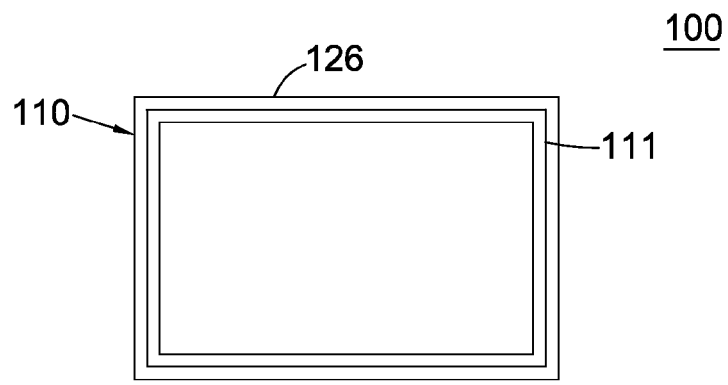
FIG. 21C is yet another exemplary detail drawing illustrating an alternative embodiment of the panel of FIG. 1, wherein the panel comprises a panel surface with a frangible region defined and/or bounded by a single notch formed adjacent to a perimeter of the panel.
Figure 21D:
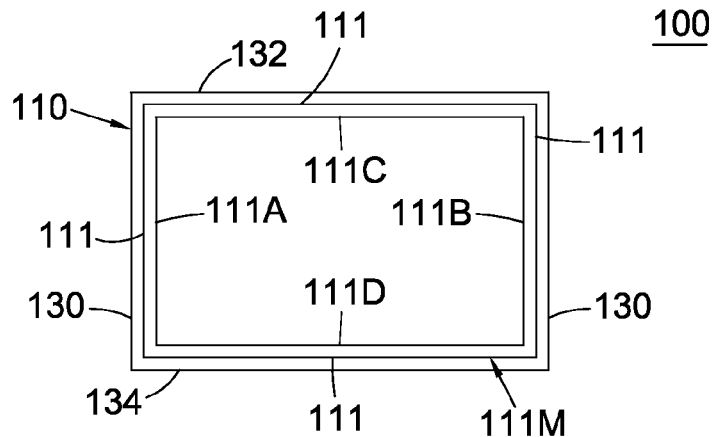
FIG. 21D is another exemplary detail drawing illustrating an alternative embodiment of the panel of FIG. 1, wherein the panel comprises a panel surface with a frangible region defined and/or bounded by a by a pair of notches formed adjacent to opposite sides of the panel and a pair of notches formed adjacent to the top and bottom of the panel, wherein the four notches form a composite notch.
Figure 21E:
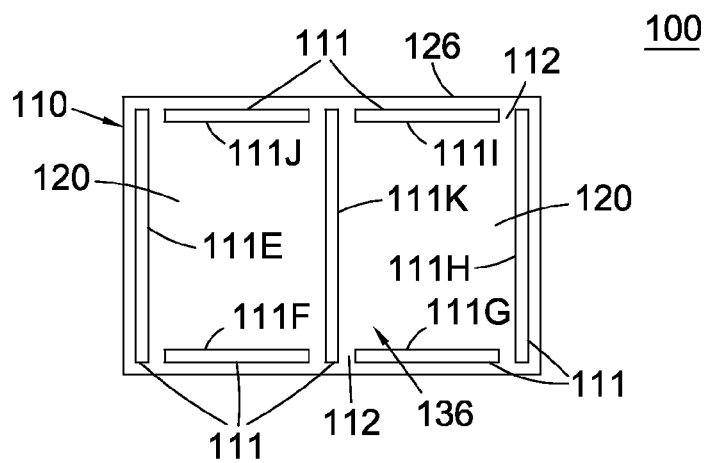
FIG. 21E is yet another exemplary detail drawing illustrating another alternative embodiment of the panel of FIG. 1, wherein the panel comprises a panel surface with a frangible region defined and/or bounded by a plurality of notches formed adjacent to a perimeter region as well as within a central area of the panel.
Figure 21F:
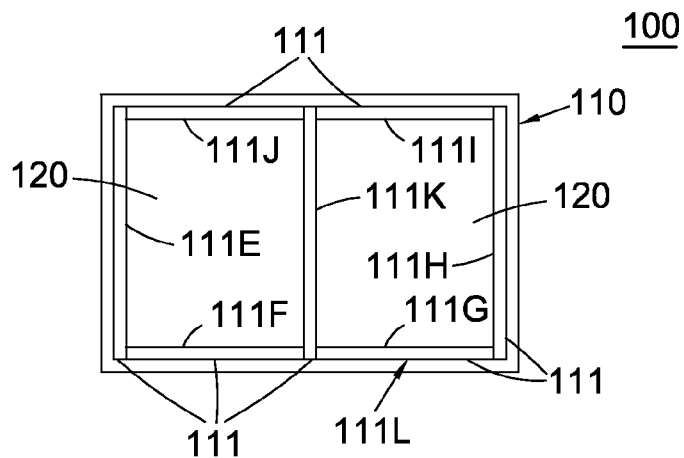
FIG. 21F is an exemplary detail drawing illustrating an alternative embodiment of the panel of FIG. 21E, wherein the seven notches form a composite notch.

FIGS. 21A-F illustrate that the panel 100 may include more than one notch 111 for defining one or more selected frangible regions 120. FIG. 21A illustrates two notches 111A-B formed adjacent to opposite side regions 130 of panel 100; while, FIG. 21B illustrates two notches 111C-D formed adjacent to a top region 132 and a bottom region 134, respectively, of the panel 100. While the widths of notches 111A-D are illustrated as being roughly the same, the widths can vary among the different notches 111. Likewise, the depths of the notches 111 can vary among the different notches 111. Furthermore, the width and depth of a selected notch 111 can vary as desired. FIG. 21C illustrates a single notch 111 formed in continuous pattern adjacent to a perimeter area 126 of the panel 100. FIG. 21D illustrates two notches 111A-B formed adjacent to opposite side regions 130 of panel 100 and two notches 111C-D formed adjacent to a top region 132 and a bottom region 134, respectively, of the panel 100. Here, the separate notches 111A-D form a composite notch 111M. FIG. 21E shows a plurality of notches 111E-J each formed adjacent to a perimeter area 126 of the panel 100 as well as a seventh notch 111K that is formed within a central area 136 of the panel 100. Notches 111E-J are shown as being separated from each other by a gap region 112. The size of gap region 112 may vary as desired and may even vary as between different pairs of the notches 111. FIG. 21F shows an alternative embodiment of the notches 111E-K of FIG. 8C. Here, the separate notches 111E-K form a composite notch 111L. The arrangements of FIGS. 21E-F provide a pair of the frangible regions 120, which can further decrease the likelihood that the panel 100 will break into dangerous shards when struck.

Figure 22A:
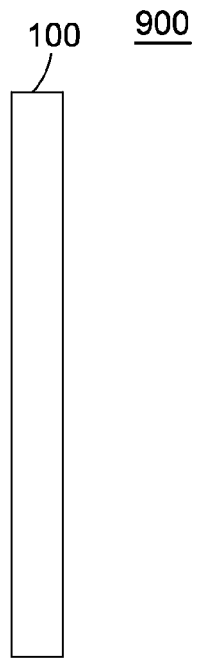
FIG. 22A is an exemplary detail drawing illustrating an embodiment of a cover assembly that includes a panel.
Figure 22B:
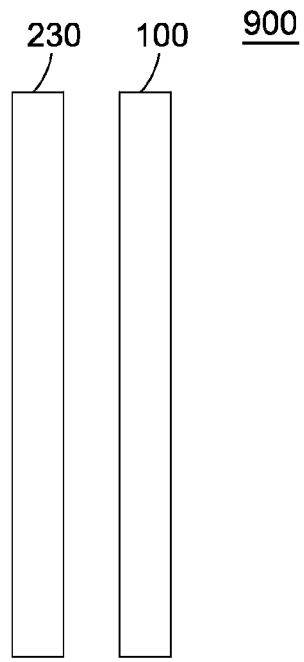
FIG. 22B is an exemplary exploded detail drawing illustrating another embodiment of a cover assembly that includes a panel and a film.
Figure 22C:
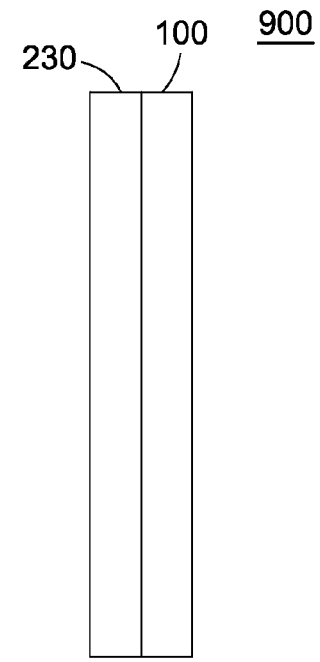
FIG. 22C is an exemplary detail drawing illustrating the cover assembly of FIG. 22B as assembled.

Multiple preferred embodiments of a cover assembly 900 suitable for use as a front cover of a video monitor are shown in FIGS. 22A-M. As shown in FIG. 22A, an embodiment of a cover assembly 900 includes the panel 100 of FIG. 1. Turning to FIG. 22B, the elements of a cover assembly 900 are shown separated for clarity. Specifically, the cover assembly 900 includes a panel 100 and a film 230. The film 230 can comprise one or more layers and can be disposed on the panel surface 110 via any conventional manner. Turning to FIG. 22C, the film 230 is shown as being applied to the panel 100.

Figure 22D:
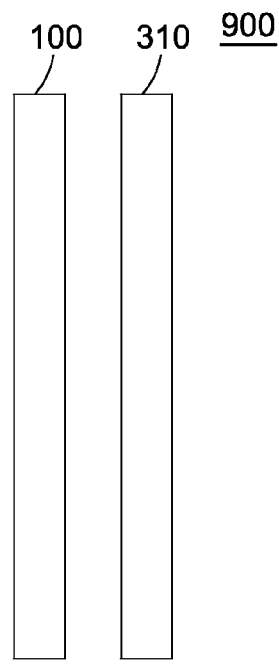
FIG. 22D is an exemplary exploded detail drawing illustrating another embodiment of a cover assembly that includes a panel and a touch sensor.
Figure 22E:
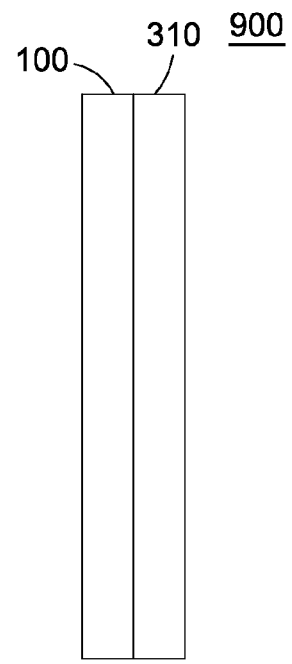
FIG. 22E is an exemplary detail drawing illustrating the cover assembly of FIG. 22D as assembled.

Turning to FIG. 22D, the elements of another embodiment of a cover assembly 900 are shown separated for clarity. Specifically, the cover assembly 900 includes a panel 100 and a touch sensor 310. The touch sensor 310 may implement any one or more conventional touch sensing technologies such as resistive or capacitive touch technology and may be translucent. Turning to FIG. 22E, the cover assembly 900 comprises a touch sensor 310 coupled to the panel 100 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the touch sensor 310 relative to one another.

Figures 22F, 22G:
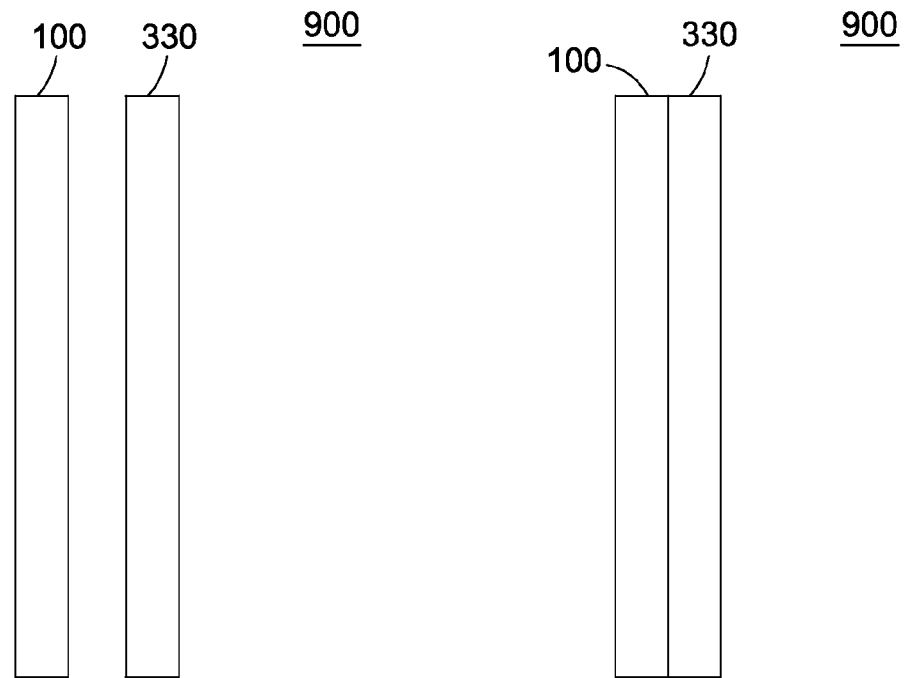
FIG. 22F is an exemplary exploded detail drawing illustrating another embodiment of a cover assembly that includes a panel and a view filter.
FIG. 22G is an exemplary detail drawing illustrating the cover assembly of FIG. 22F as assembled.

Turning to FIG. 22F, the elements of another embodiment of a cover assembly 900 are shown separated for clarity. Specifically, the cover assembly 900 includes a panel 100 and a view filter 330. When used in conjunction with a monitor, the view filter 330 decreases the viewing angle of the monitor, thereby providing greater privacy to the viewer of the monitor and reducing distraction to neighbors. The view filter 330 may be implemented via any one conventional technology such as micro-louvers. Turning to FIG. 22G, the cover assembly 900 comprises a view filter 330 coupled to the panel 100 via any conventional manner such as with an adhesive, fasteners, detents or applied force (e.g., magnets, suction cups or friction).

Figures 22H, 22I:
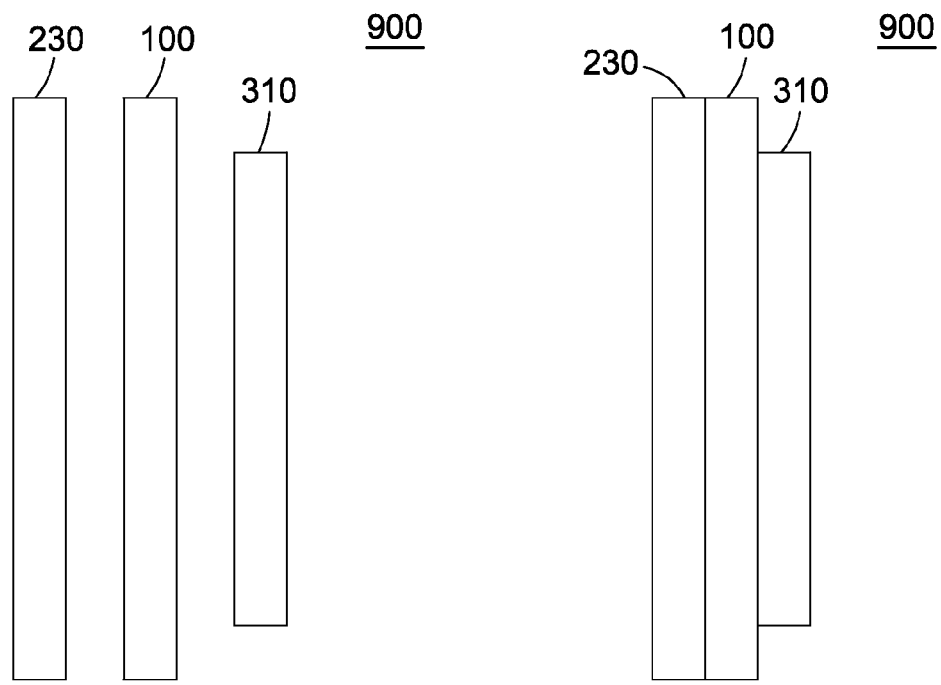
FIG. 22H is an exemplary exploded detail drawing illustrating another embodiment of a cover assembly that includes a panel, a film and a touch sensor.
FIG. 22I is an exemplary detail drawing illustrating the cover assembly of FIG. 22H as assembled.

Turning to FIG. 22H, the elements of another embodiment of a cover assembly 900 are shown separated for clarity. Specifically, the cover assembly 900 includes a panel 100, a film 230 and a touch sensor 310. The film 230 can comprise one or more layers and can be disposed on the panel surface 110 via any conventional manner. The touch sensor 310 may implement any one or more conventional touch sensing technologies such as resistive or capacitive technology. Turning to FIG. 22I, the cover assembly 900 comprises a view filter 330 coupled to the panel 100 via any conventional manner such as with an adhesive, fasteners, detents or applied force (e.g., magnets, suction cups or friction). Furthermore, the film 230 is shown as being applied to the panel 100.

Figure 22J:
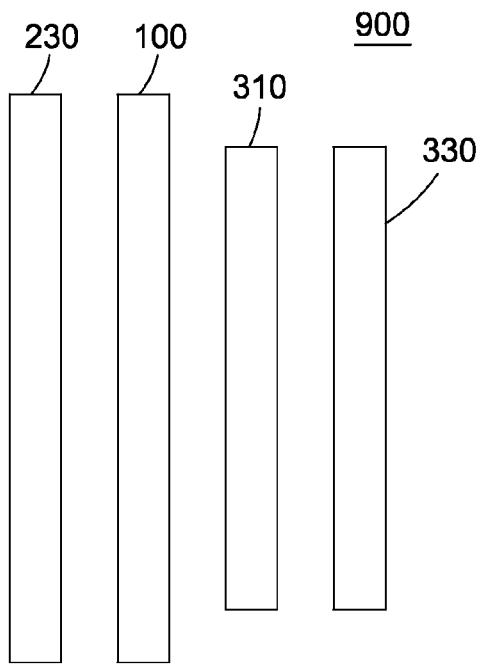
FIG. 22J is an exemplary exploded detail drawing illustrating another embodiment of a cover assembly that includes a panel, a film, a touch sensor and a view filter.
Figure 22K:
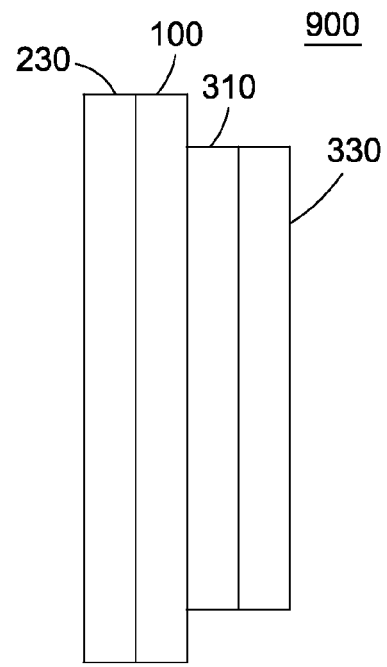
FIG. 22K is an exemplary detail drawing illustrating the cover assembly of FIG. 22J as assembled.

Turning to FIG. 22J, the elements of another embodiment of a cover assembly 900 are shown separated for clarity. Specifically, the cover assembly 900 includes a panel 100, a film 230, a touch sensor 310 and a view filter 330. The film 230 can comprise one or more layers and can be disposed on the panel surface 110 via any conventional manner. The touch sensor 310 may implement any one or more conventional touch sensing technologies such as resistive or capacitive technology. When used in conjunction with a monitor, the view filter 330 decreases the viewing angle of the monitor, thereby providing greater privacy to the viewer of the monitor and reducing distraction to neighbors. The view filter 330 may be implemented via any one conventional technology such as micro-louvers. Turning to FIG. 22K, the cover assembly 900 comprises a view filter 330 coupled to the touch sensor 310, which is in turn coupled to the panel 100 via any conventional manner such as with an adhesive, fasteners, detents or applied force (e.g., magnets, suction cups or friction). Furthermore, the film 230 is shown as being applied to the panel 100.

Figure 22L:
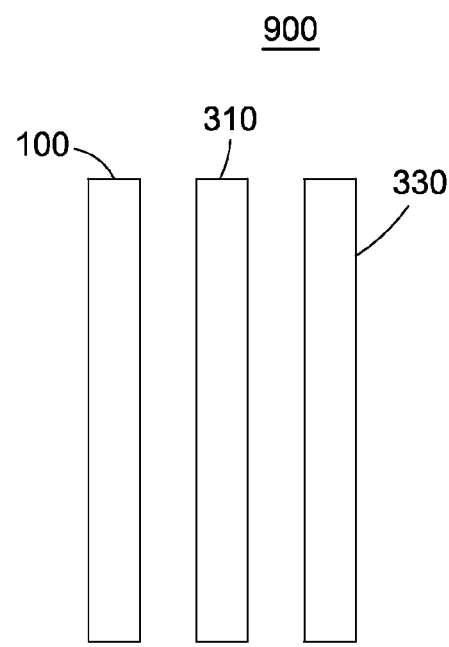
FIG. 22L is an exemplary exploded detail drawing illustrating another embodiment of a cover assembly that includes a panel, a film, a touch sensor and a view filter.
Figure 22M:
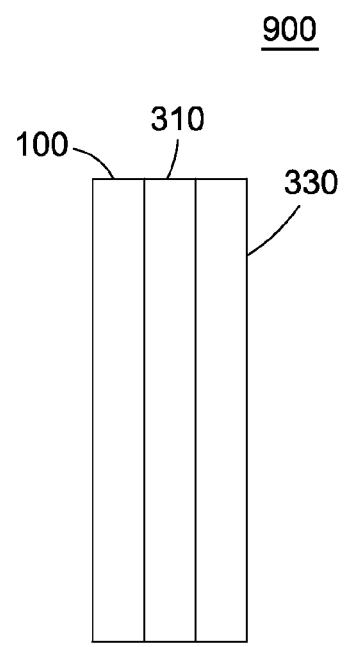
FIG. 22M is an exemplary detail drawing illustrating the cover assembly of FIG. 22L as assembled.

Turning to FIG. 22L, the elements of another embodiment of a cover assembly 900 are shown separated for clarity. Specifically, the cover assembly 900 includes a panel 100, a touch sensor 310 and a view filter 330. The touch sensor 310 may implement any one or more conventional touch sensing technologies such as resistive or capacitive technology. When used in conjunction with a monitor, the view filter 330 decreases the viewing angle of the monitor, thereby providing greater privacy to the viewer of the monitor and reducing distraction to neighbors. The view filter 330 may be implemented via any one conventional technology such as micro-louvers. Turning to FIG. 22M, the cover assembly 900 comprises a view filter 330 coupled to the touch sensor 310, which is in turn coupled to the panel 100, via any conventional manner such as with an adhesive, fasteners, detents or applied force (e.g., magnets, suction cups or friction). Note, while a cover assembly 900 has been shown in FIGS. 22A-M as individual elements for purposes of clarity, one or more of the disclosed elements may be combined. For example, a panel 100 may integrate a touch sensor 310 and/or a view filter 330.

In one embodiment, a frangible panel assembly is preferably incorporated into a line-replaceable unit (LRU) as disclosed in application Ser. No. 12/967,713, filed on Dec. 14, 2010, entitled "SYSTEM AND METHOD FOR PROVIDING DYNAMIC POWER MANAGEMENT AND CONTROL IN A VEHICLE INFORMATION SYSTEM," which is assigned to the assignee of the present application and the respective disclosure of which is hereby incorporated herein by reference in its entirety. The use of LRUs facilitates maintenance because a LRU that is broken or defective can simply be removed and replaced with a new (or different) LRU. Indeed, as a film 230 can be applied to a panel 100 to help contain the shards within frangible panel assembly 200, a LRU with a broken panel 100 can be easily and safely removed. The broken or defective LRU thereafter may even be repaired for subsequent installation. Obsolete components thereby can be readily upgraded by replacing any obsolete LRUs with new LRUs.

Figure 23A:
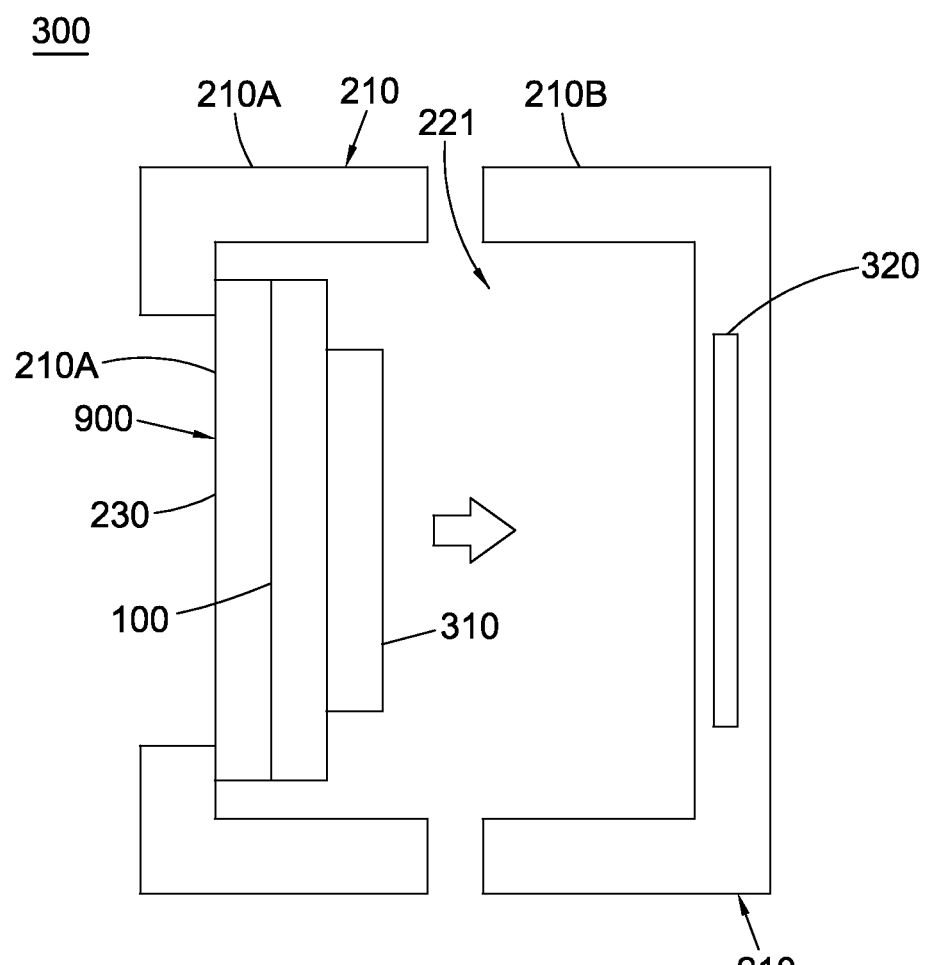
FIG. 23A is an exemplary detail drawing illustrating an embodiment of a video monitor assembly that includes a video display and a cover assembly.

Turning to FIG. 23A, an exemplary LRU is shown as being provided as a video monitor assembly 300. As illustrated in FIG. 23A, the video monitor assembly 300 comprises a housing 210 and a cover assembly 900. As shown, the cover assembly 900 may include a film 230 applied to a panel 100 that is coupled to a touch sensor 310. The housing 210 may include a first housing member 210A and a second housing member 210B. The first housing member 210A is coupled to the cover assembly 900 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the cover assembly 900 and the first housing member 210A relative to one another. The second housing member 210B includes a video display 320. In one embodiment, the video display 320 can comprise a liquid crystal display (LCD) or an active-matrix organic light-emitting diode (AMOLED) display with at least video graphics array (VGA) resolution. However, any conventional video technology may be used. As indicated in FIG. 23A, the housing 210 is configured such that a chamber 211 is defined (and/or formed) when the first housing member 210A is coupled to the second housing member 210B via any conventional manner as noted above. Furthermore, when the first housing member 210A is coupled to the second housing member 210B, the only exposed portion of the cover assembly 900 is a film surface 230A of the film 230.

Figure 23B:
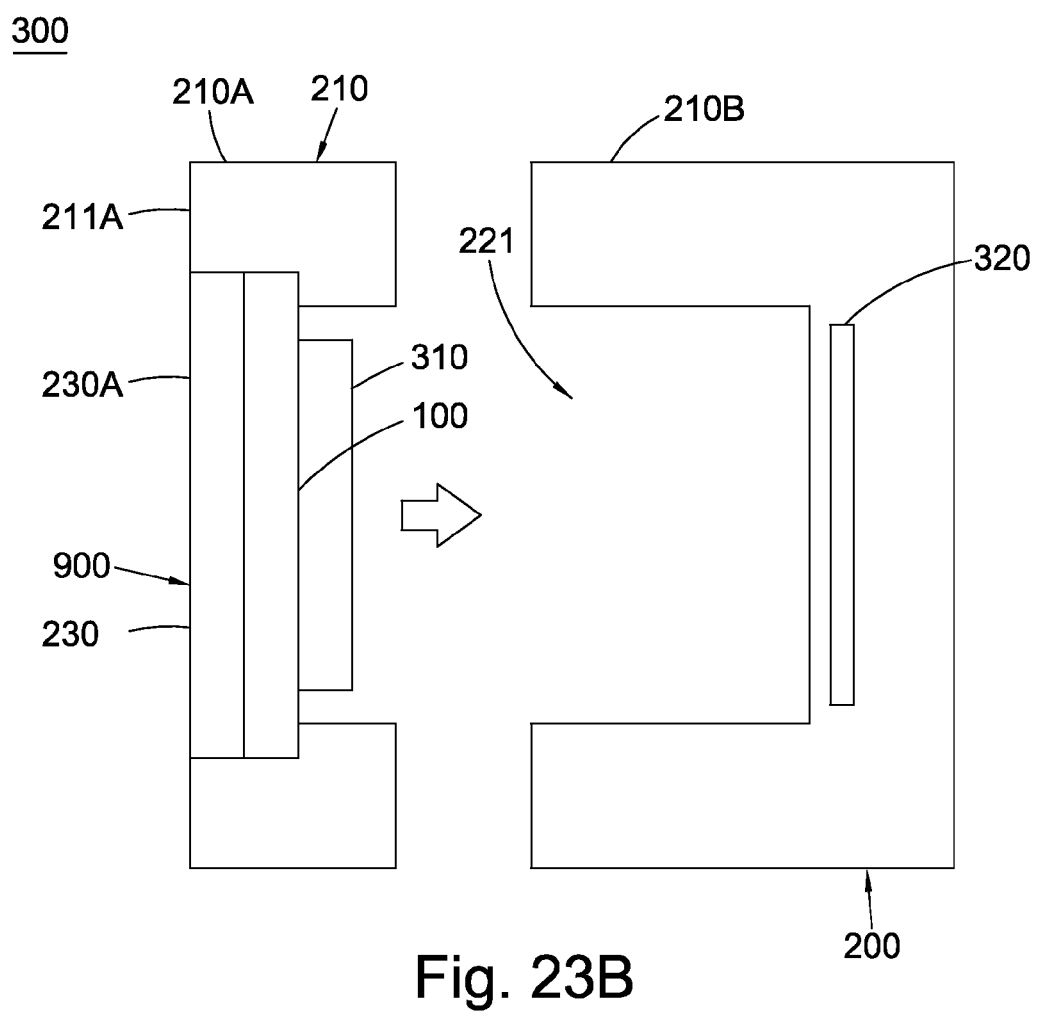
FIG. 23B is an exemplary detail drawing illustrating another embodiment of a video monitor assembly that includes a video display and a cover assembly, wherein the cover assembly can be coupled to a first housing member such that a film surface is flush with a face surface of the first housing member.

Turning to FIG. 23B, another exemplary LRU is shown as being provided as a video monitor assembly 300. As illustrated in FIG. 23B, the video monitor assembly 300 comprises a housing 210 and a cover assembly 900. As shown, the cover assembly 900 may include a film 230 applied to a panel 100 that is coupled to a touch sensor 310. The housing 210 may include a first housing member 210A and a second housing member 210B. The first housing member 210A is coupled to the cover assembly 900 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the cover assembly 900 and the first housing member 210A relative to one another. Moreover, as shown in FIG. 23B, the first housing member 210A is configured such that when the cover assembly 900 is coupled thereto, a film surface 230A of the film 230 is flush with a face surface 211A of the first housing member 210A. The second housing member 210B includes a video display 320. In one embodiment, the video display 320 can comprise a liquid crystal display (LCD) or an active-matrix organic light-emitting diode (AMOLED) display with at least video graphics array (VGA) resolution. However, any conventional video technology may be used. As indicated in FIG. 23B, the housing 210 is configured such that a chamber 211 is defined (and/or formed) when the first housing member 210A is coupled to the second housing member 210B via any conventional manner as noted above. Furthermore, when the first housing member 210A is coupled to the second housing member 210B, the only exposed portion of the cover assembly 900 is a film surface 230A of the film 230.

Figure 23C:
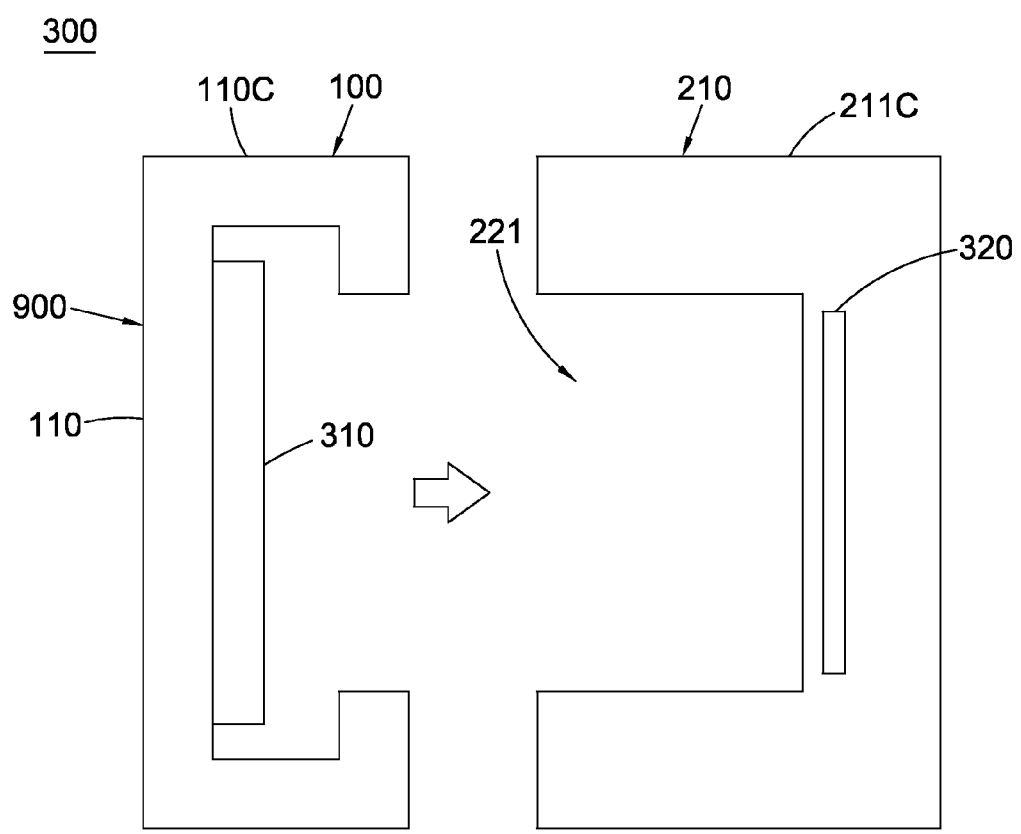
FIG. 23C is an exemplary detail drawing illustrating yet another preferred embodiment of a video monitor assembly that includes a video display and a cover assembly, wherein the cover assembly can be coupled to a housing such that a panel side surface is flush with a housing outer side surface.

Turning to FIG. 23C, another exemplary LRU is shown as being provided as a video monitor assembly 300. As illustrated in FIG. 23C, the video monitor assembly 300 comprises a housing 210 and a cover assembly 900. As shown, the cover assembly 900 may include a C-shaped panel 100 that is coupled to a touch sensor 310 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the cover assembly 900 and the housing 210 relative to one another. The housing 210 defines (and/or forms) a partially enclosed chamber 221 and further includes a video display 320. In one embodiment, the video display 320 can comprise a liquid crystal display (LCD) or an active-matrix organic light-emitting diode (AMOLED) display with at least video graphics array (VGA) resolution. However, any conventional video technology may be used. As indicated in FIG. 23C, the housing 210 is configured such that a chamber 211 is enclosed by the cover assembly 900 when the cover assembly 900 is coupled to housing member 210 via any conventional manner as noted above. Moreover, the housing 210 and the panel 100 are configured such that a panel side surface 110C is flush with a housing outer side surface 211C, when the cover assembly 900 is coupled to the housing 210. Furthermore, when the cover assembly 900 is coupled to the housing 210, the only exposed portion of the cover assembly is a panel surface 110 and a panel side surface 110C of the panel 100.

Figure 24:
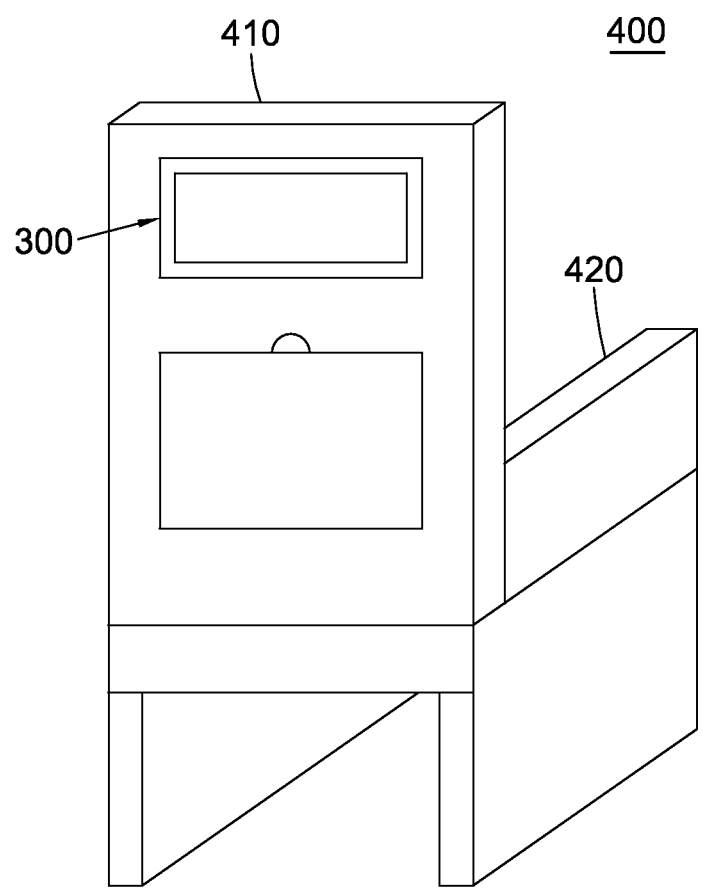
FIG. 24 is an exemplary detail drawing of a user seat assembly that includes a video monitor assembly.

FIG. 24 shows an exemplary user seat assembly 400 that includes a video monitor assembly 300. Although suitable for use in stationary operating environments, such as buildings, the user seat assembly 400 advantageously can be installed for use in a passenger vehicle. In one embodiment, for example, the user seat assembly 400 can be disposed aboard a conventional passenger aircraft, wherein the video monitor assembly 300 can be provided as a part of an in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif. Even though shown as being disposed in a seatback 410 of the user seat assembly 400, the video monitor assembly 300 can be disposed at any conventional region of the user seat assembly 400, such as at an armrest 420. In addition, the video monitor assembly 300 can be provided as part of an instrument panel that displays flight information such as altitude as Global Positioning System (GPS) location information. The ability to safely incorporate a translucent panel, such as glass, as a video monitor front cover is both unexpected and addresses a long-felt need, particularly in the aviation industry. Indeed, airlines and their suppliers have tried unsuccessfully for years to design a front cover made of glass that fails in a safe and predictable manner.

In one embodiment, the panel 100 of FIG. 1 is comprised of glass and can be fabricated according to the exemplary method 500 as illustrated in FIG. 25. At 510, a glass sheet can be formed using any conventional process such as a float glass process. Panel 100 is preferably comprised of Corning® Gorilla® Glass. Corning® and Gorilla® are registered trademarks of Corning Inc., of Corning, N.Y. In fabricating Corning Gorilla Glass, a fusion method can be employed. For example, 510 can comprise 512, 514 and 516 as illustrated in FIG. 26A. At 512, a molten glass composition is prepared. At 514, a V-shaped trough is over-filled with the molten glass composition. At 516, the molten glass is allowed to flow evenly on both side regions of the trough and rejoin at the bottom region to form a sheet of glass. Returning to FIG. 25, at 520, the panels 100 can be cut from the sheet of glass. Glass can be cut using conventional processes. Optionally, at 530, the panel 100 can be molded using any one or more conventional processes such as Thermal Sheet Molding by GPInnvation GmbH of Potsdam, Germany. Also optionally, at 540, the panel 100 can be finished using conventional processes. For example, sharp edges can be polished smooth.

To form a boundary 122, one or more notches 111 can be formed on the panel 100 at 550. To lessen its visibility, the notches 111 preferably are disposed only on one surface of the glass panel 100. The glass may be etched using any one or more conventional techniques such as laser cutting, grinding, chemical etching, and/or end milling. The depth and width of a selected notch 111 each can vary and can comprise any suitable dimension. Likewise, the depth and width of the notches 111 can vary among the different notches 111. In one embodiment, the notch 111 can have a depth of up to approximately 0.1 mm or more and/or a width of up to approximately 0.87 mm or more, where the panel 100 can have a thickness of up to approximately 1.1 mm or more.

As desired, the depth and width of notch 111 can be independently established as a preselected percentage (and/or a preselected percentage range) of the maximum depth and width, respectively, of the notch 111. Exemplary preselected percentage ranges can include between fifty percent (50%) and one hundred percent (100%) of the maximum depth and/or width of notch 111, including any percentage sub-ranges, such as a five percent sub-range (i.e., between sixty-five percent (65%) and seventy percent (70%)) and/or a ten percent sub-range (i.e., between sixty percent (60%) and seventy percent (70%)), within the preselected percentage range, without limitation. As set forth above, the numerical values set cited throughout this specification are intended for purposes of illustration only and not for purposes of limitation.

Figure 27A:
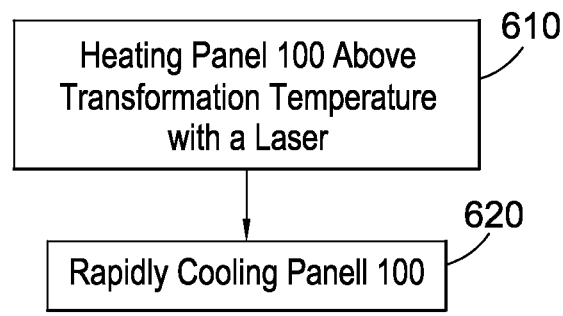
FIG. 27A is a flowchart illustrating an exemplary method of forming a locally limited stress gradient in a panel.
Figure 27B:
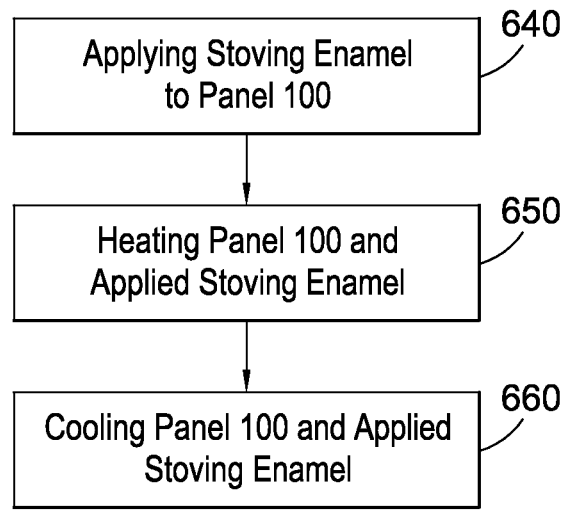
FIG. 27B is a flowchart illustrating another exemplary method of forming a locally limited stress gradient in a panel.

In the manner set forth above with reference to FIG. 18C, the frangible region 120 can be defined and/or bounded via any conventional manner, including a locally limited stress gradient 114 that forms a boundary 122. A locally limited stress gradient 114 can be formed in a panel 100 comprised of glass according to an exemplary method 600 as illustrated in FIG. 27A. Turning to FIG. 27A, at 610, the panel 100 can be heated above the transformation temperature with a laser along a desired boundary 122. At 620, the panel 100 can be rapidly cooled, thereby forming a locally limited stress gradient along the desired boundary 122. Alternatively, a locally limited stress gradient 114 can be formed in a panel 100 comprised of glass according to an exemplary method 604 as illustrated in FIG. 27B. Turning to FIG. 27B, a stoving enamel can be applied to the panel 100 at 640 along a desired boundary 122, wherein the stoving enamel has a coefficient of expansion sufficiently different from the coefficient of expansion of glass. The stoving enamel can be applied using any conventional process, such as printing. At 650, the panel 100 and the applied stoving enamel can be heated. At 660, the panel 100 and the applied stoving enamel can be cooled, thereby forming a locally limited stress gradient along the desired boundary 122.

Returning to FIG. 25, the method 500 is shown, at 560, as optionally further comprising toughening the panel 100. In other words, a panel 100, can be formed from glass fabricated in accordance with the method 500 and, at 560, optionally can be toughened. Glass can be toughened using any one or more conventional processes such as thermal toughening (e.g., tempered glass) or chemical/ion exchange toughening (e.g., Corning Gorilla Glass). In the manner discussed in more detail above with reference to the method 500 (shown in FIG. 25), the panel 100 preferably comprises Corning Gorilla Glass. In fabricating Corning Gorilla Glass, a chemical toughening method can be employed. For example, 560 can comprise 562 and 564 as illustrated in FIG. 26B. At 562, a potassium salt bath can be heated to a maximum temperature of 400 degrees Celsius or more. At 564, the panels 100 can be dipped into the heated potassium salt bath.

Figure 28A:
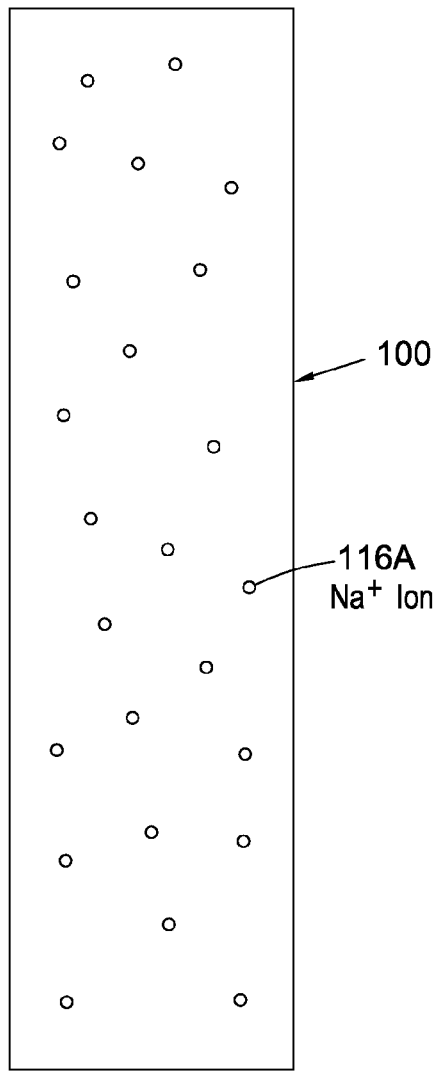
FIG. 28A is an exemplary detail drawing illustrating a panel that has been cut from a glass sheet in accordance with the method of FIG. 25.
Figure 28B:
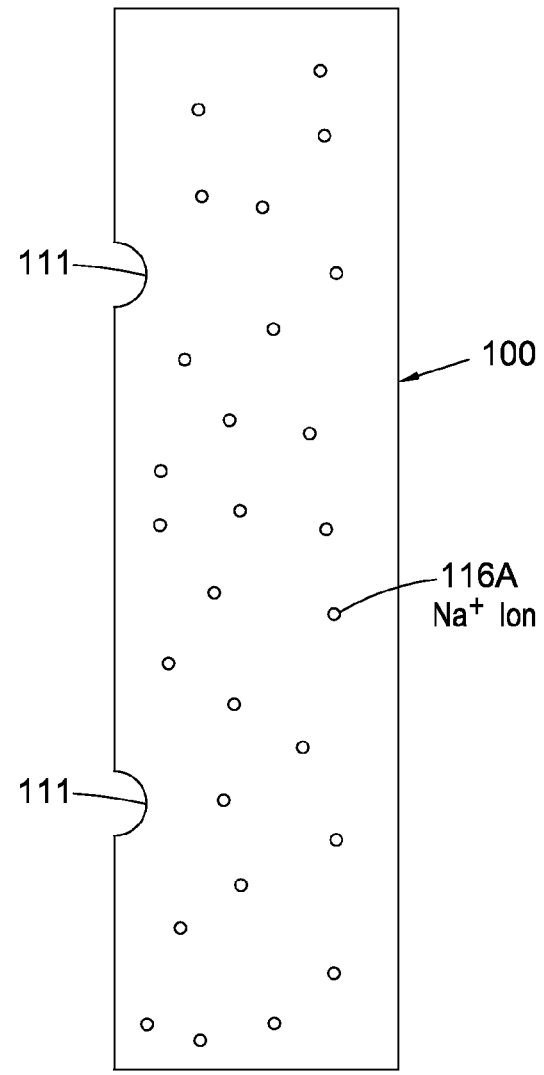
FIG. 28B is an exemplary detail drawing illustrating a panel that has been notched in accordance with the method of FIG. 25.
Figure 28C:
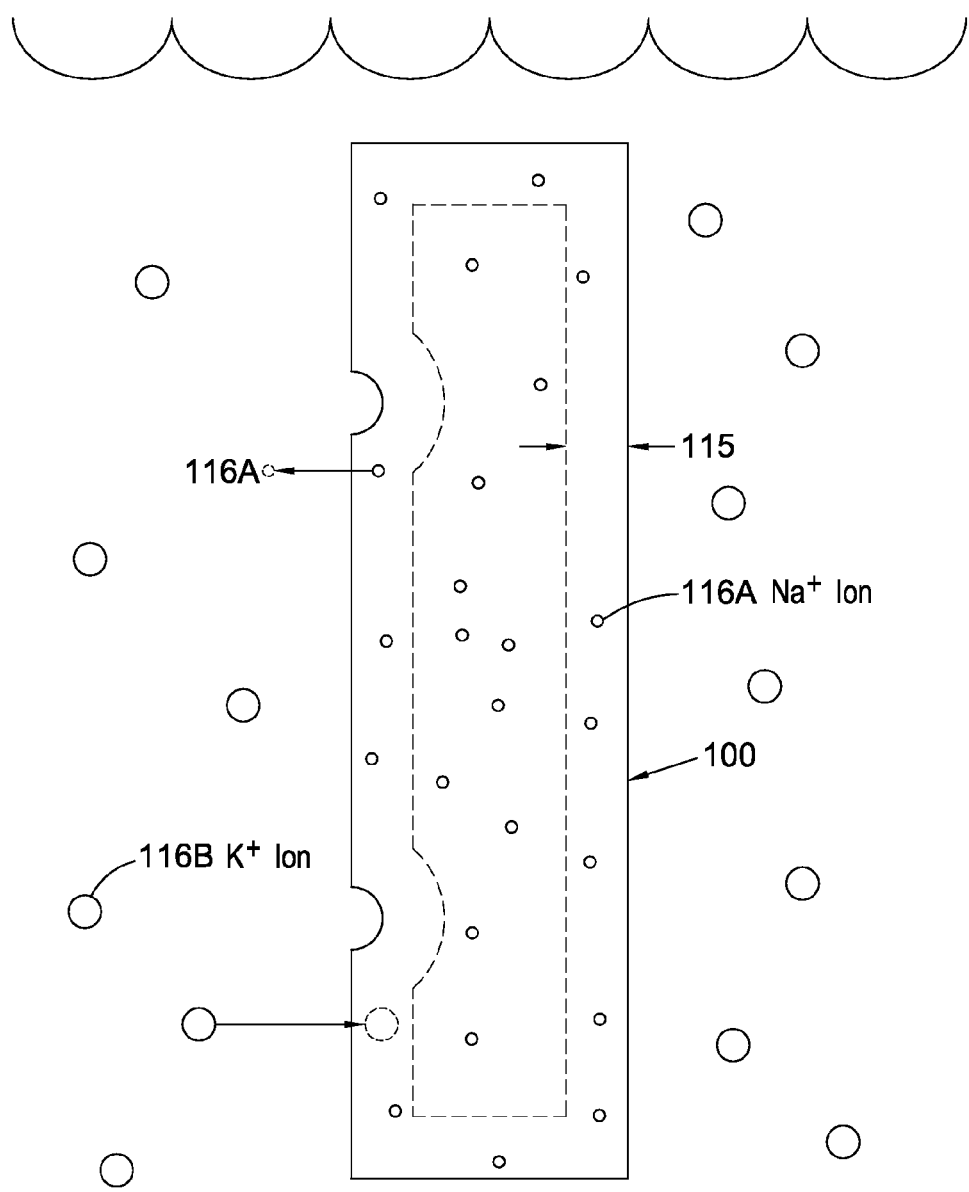
FIG. 28C is an exemplary detail drawing illustrating a panel undergoing toughening in accordance with the method of FIG. 26B.
Figure 28D:
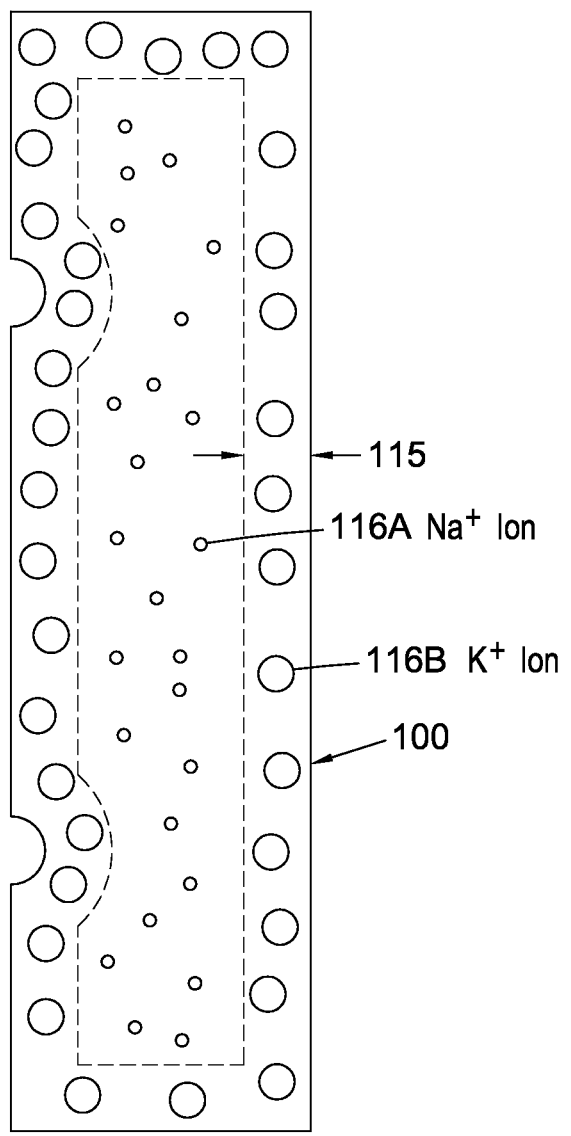
FIG. 28D is an exemplary detail drawing illustrating a panel that has been toughened in accordance with the method of FIG. 26B.

In the manner discussed in more detail above with reference to the method 500 (shown in FIG. 25), the panel 100 preferably comprises Corning Gorilla Glass. Turning to FIG. 28A, a panel 100 is shown that has completed at least steps 510 and 520 of method 500. In a preferred embodiment, the panel 100 comprises glass that contains a plurality of sodium ions 116A. Turning to FIG. 28B, the panel 100 has completed step 550 of method 500 and is shown with a notch 111. Turning to FIG. 28C, the panel 100 is shown undergoing step 564, as illustrated in FIG. 26C. Specifically, panel 100 is shown submerged in a heated potassium salt bath filled with a plurality of potassium ions 116B. During its submersion, the panel 100 undergoes an ion exchange process. Specifically, the sodium ions 116A migrate out of a peripheral region 115 of the panel 100 into the heated salt bath and are replaced with the potassium ions 116B that migrate from the heated potassium salt bath into the peripheral region 115 of the panel 100. While not shown to scale, the sodium ions 116A are smaller than the potassium ions 116B as indicated in FIGS. 28C-D. Turning to FIG. 28D, the panel 100 has been removed from the heated potassium salt bath, and the ion exchange process has been completed. Specifically, a compressed peripheral region 115 in panel 100 is formed where the larger potassium ions 116B have replaced the smaller sodium ions 116A. The compressed peripheral region 115 helps to inhibit flaw formation and propagation in the panel 100.

Figure 29:
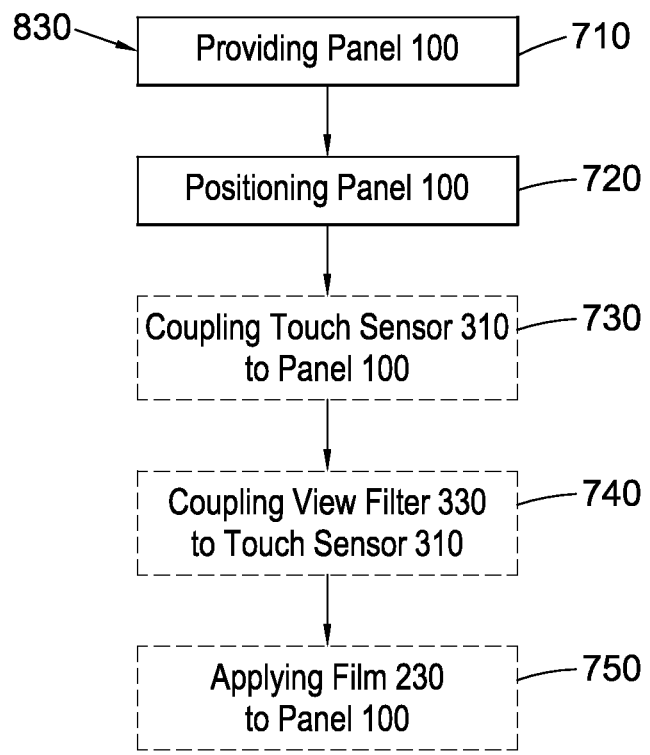
FIG. 29 is a flowchart illustrating an exemplary method of assembling a cover assembly as shown in FIGS. 22A-M.

FIG. 29 illustrates an exemplary method 700 of assembling a cover assembly 900 as shown in FIGS. 22A-M. At 710, a panel 100 can be provided. The panel 100 can be properly positioned, at 720, to be operated on. Optionally, at 730, a touch sensor 310 can be coupled to the panel 100 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the touch sensor 310 and the panel 100 relative to one another. Optionally, at 740, a view filter 330 can be coupled to the touch sensor 310 via any conventional manner as noted above. Optionally, at 750, a film 230 can be applied to a panel surface 110 of the panel 100 via any conventional manner, such as with an adhesive, and comprises one or more layers.

Figure 30A:
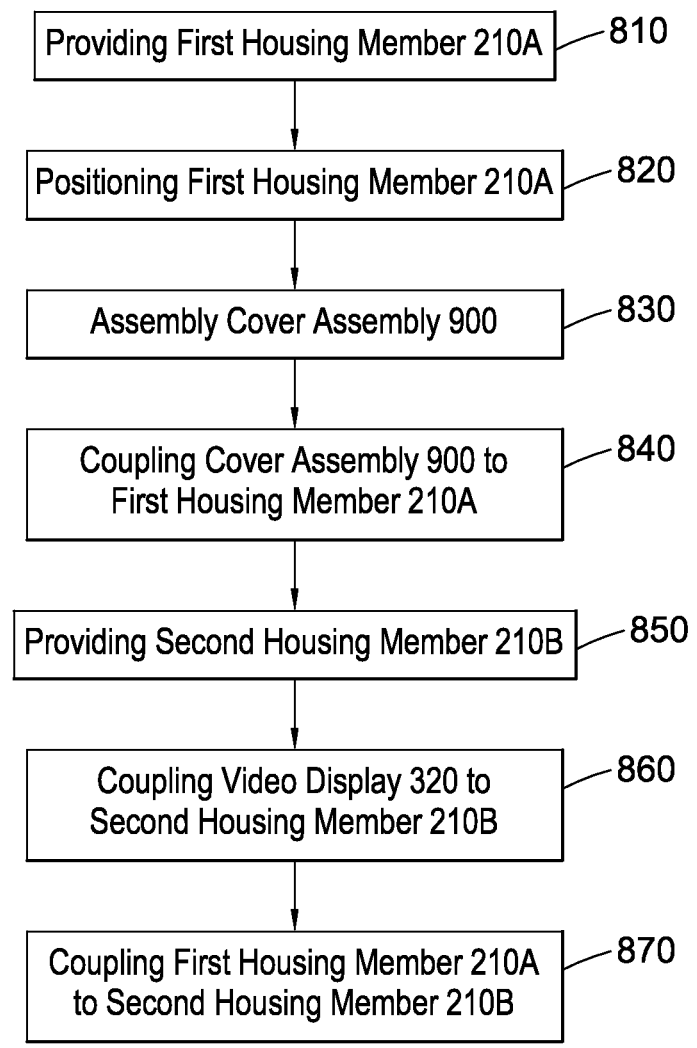
FIG. 30A is a flowchart illustrating an exemplary method of assembling a video monitor assembly with a first housing member and a second housing member.
Figure 30B:
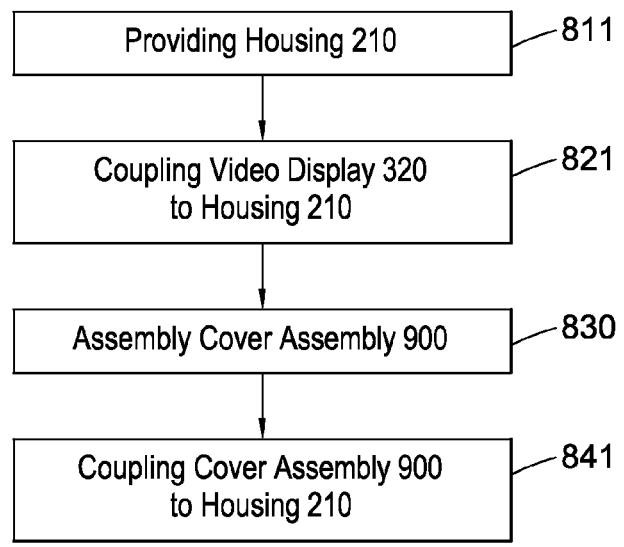
FIG. 30B is a flowchart illustrating an exemplary method of assembling a video monitor assembly with a housing.

FIGS. 30A-B illustrate exemplary methods of assembling a video monitor assembly 300. FIG. 30A illustrates an exemplary method 800A of assembling a video monitor assembly 300 comprising a cover assembly 900, a first housing member 210A and a second housing member 210B. At 810, the first housing member 210A can be provided. At 820, the first housing member can be properly positioned to be operated on. At 830, the cover assembly 900 can be assembled according to the exemplary method 700 as illustrated in FIG. 29. At 840, the cover assembly 900 can be coupled to the first housing member 210A via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the cover assembly 900 and the first housing member 210A relative to one another. At 850, the second housing member 210B can be provided. At 860, a video display 320 can be coupled to the second housing member 210B via any conventional manner as noted above. At 870, the first housing member 210A can be coupled to the second housing member 210B via any conventional manner as noted above.

FIG. 30B illustrates an exemplary method 800A of assembling a video monitor assembly 300 comprising a cover assembly 900 and a housing 210. At 811, the housing 210 can be provided. At 821, a video display 320 can be coupled to the housing 210 via any conventional manner such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the video display 320 and the housing 210 relative to one another. At 830, the cover assembly 900 can be assembled according to the exemplary method 700 as illustrated in FIG. 29. At 841, the cover assembly 900 can be coupled to the housing 210 via any conventional manner as noted above.

Figure 31A:
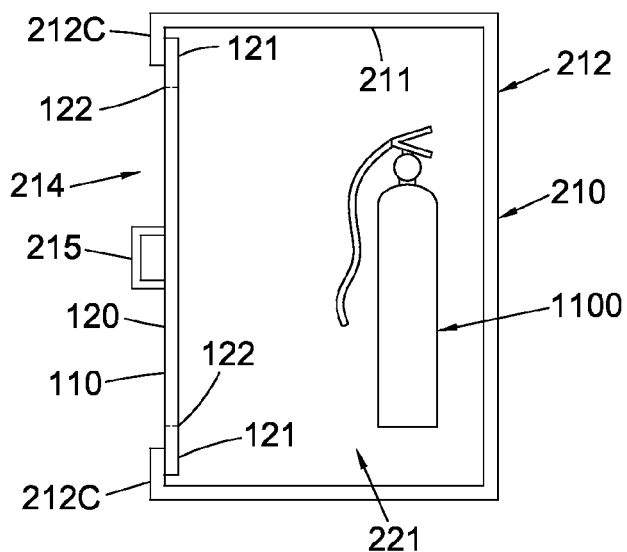
FIG. 31A is an exemplary detail drawing illustrating an embodiment of a fire extinguisher cabinet assembly that includes the panel of FIG. 1 and a housing, wherein an inner surface of the housing partially encloses a chamber suitable for housing a fire extinguisher.

In order to help prevent tampering with a fire extinguisher, prior art fire extinguisher cabinets have employed tempered glass panels, which shatter into many small chunks when the panel is struck with sufficient force. It would be desirable and address a long felt need to eliminate or substantially eliminate the mess and potential danger posed by the small chunks of shattered tempered glass. Turning to FIG. 31A, a panel 100 can also be advantageously incorporated into a fire extinguisher cabinet assembly 1000. An embodiment of the fire extinguisher cabinet assembly 1000 includes a housing 210 with a wall 212. The inner surface 211 of the housing 210 forms (and/or defines) a chamber 221 with an opening 214. The panel 100 is coupled with an inner surface 211 of a face wall 212C of the housing 210, thereby closing opening 214. The chamber can be properly sized to house a fire extinguisher 1100. The panel 100 may be coupled with the inner surface 211 of the housing 210 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another.

Figure 31B:
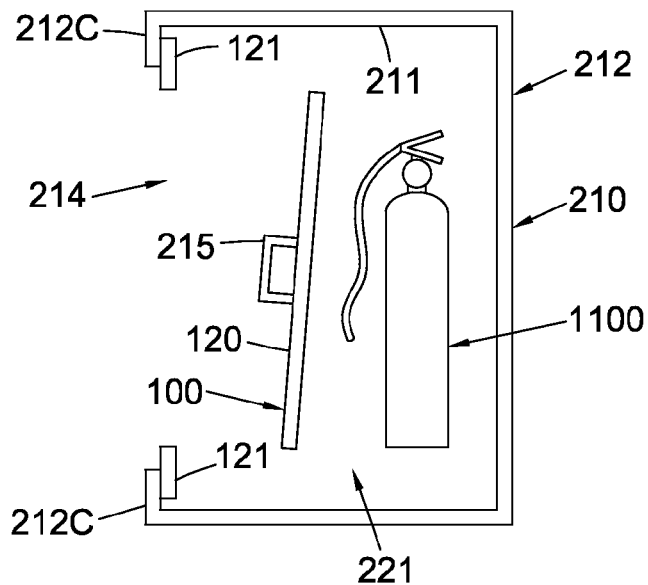
FIG. 31B is an exemplary detail drawing illustrating the fire extinguisher cabinet assembly of FIG. 31A, wherein the frangible region of the panel has separated from a remainder of the panel and receded into the chamber.
Figure 31C:
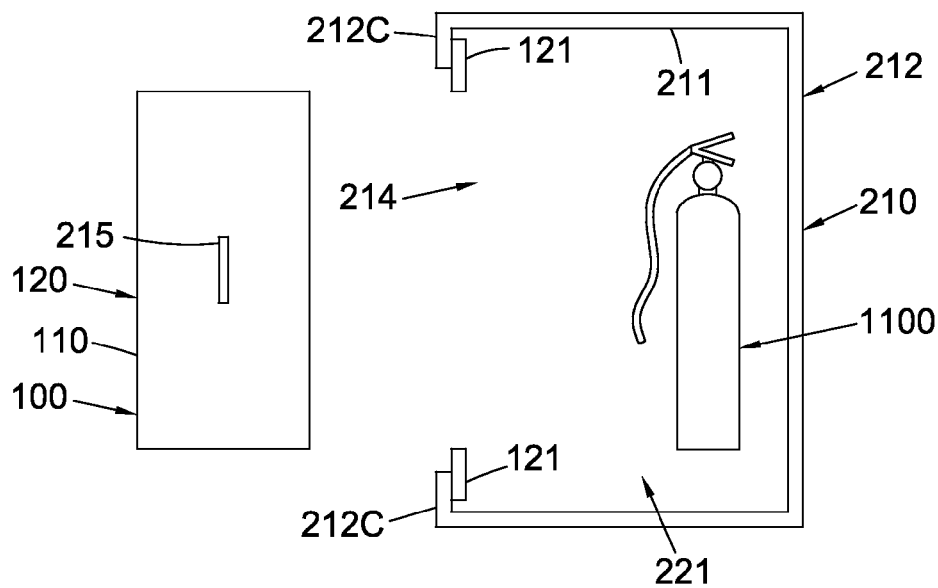
FIG. 31C is an exemplary detail drawing illustrating the fire extinguisher cabinet assembly of FIG. 31A, wherein the frangible region of the panel has separated from a remainder of the panel and been removed from the chamber.

Turning to FIG. 31B, upon sufficient impact, the panel 100 may fail in a predictable manner, allowing a frangible region 120 to break away from a remainder 121 of the panel 100, preferably as an intact unit without internal fracturing, and recede into the chamber 221. Turning to FIG. 31C, a handle 215 may be coupled to a panel surface 110 such that the frangible region may be safely removed from the chamber 221. A panel exhibiting both translucence and impact safety is unexpected and addresses a long-felt need in the fire extinguisher cabinet industry.

Figures 32A, 32B:
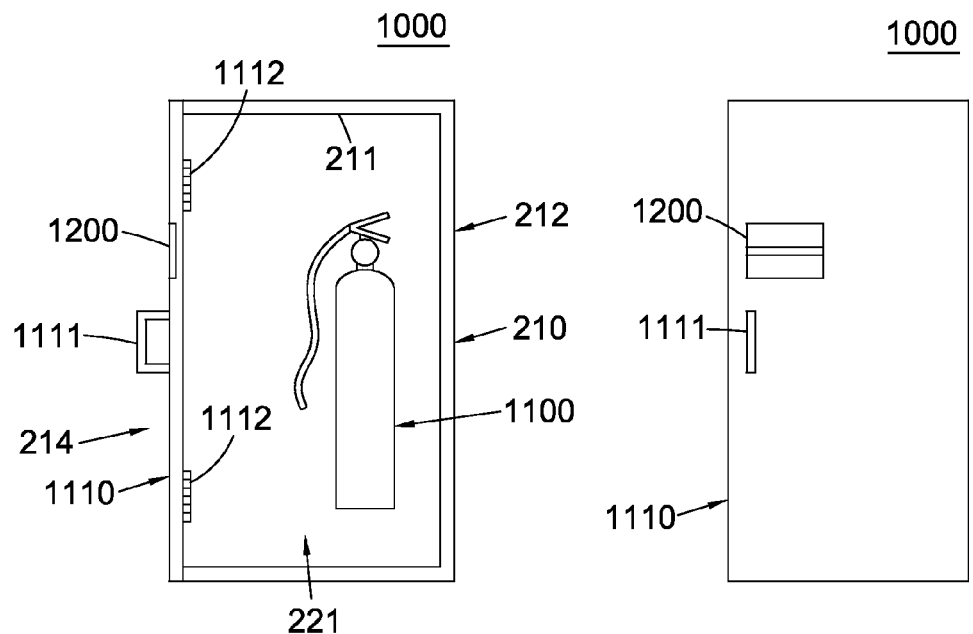
FIG. 32A is an exemplary detail drawing illustrating an embodiment of a fire extinguisher cabinet assembly that includes a door, a housing and a switch assembly that incorporates a frangible panel assembly.
FIG. 32B is an exemplary detail drawing illustrating a front view of the fire extinguisher cabinet assembly of FIG. 32A with the door closed.
Figure 32C:
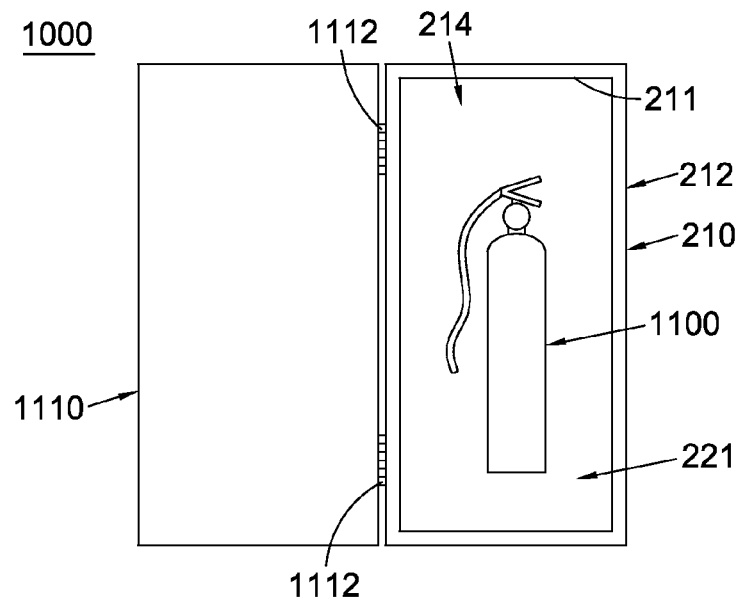
FIG. 32C is an exemplary detail drawing illustrating a front view of the fire extinguisher cabinet assembly of FIG. 32A with the door opened.

Turning to FIGS. 32A-C, a frangible panel assembly 200 can be advantageously incorporated into a switch assembly 1200 that is itself incorporated into a door 1110 of a fire extinguisher cabinet assembly 1000. Turning to FIG. 32A, an embodiment of a fire extinguisher cabinet assembly 1000 can include a housing 210 with a wall 212 The inner surface 211 of the housing 210 forms (and/or defines) a chamber 221 with an opening 214. A door 1110 can be coupled to the housing 210 via a hinge 1112 or any other conventional manner such that the door can open and close, thereby opening and closing the opening 214. As shown in FIG. 32A, the door 1110 is in a closed position. The chamber can be properly sized to house a fire extinguisher 1100. The coupling may be achieved via any conventional manner, such as with an adhesive, fasteners, detents or applied force (e.g., magnets, suction cups or friction). Turning to FIG. 32B, a front view of the fire extinguisher cabinet assembly 1000 is shown with the door 1100 closed. A handle 1111 can be coupled to the door 1110 via any conventional manner to facilitate opening and closing of the door 1110. Door 1110 can also include a switch assembly 1200 that can lock or unlock the door 1110 via any conventional manner, such as a latch. Turning to FIG. 32C, the fire extinguisher cabinet assembly 1000 is shown with the door 1110 in its open position with the hinge 1112 clearly visible.

Figure 33A:
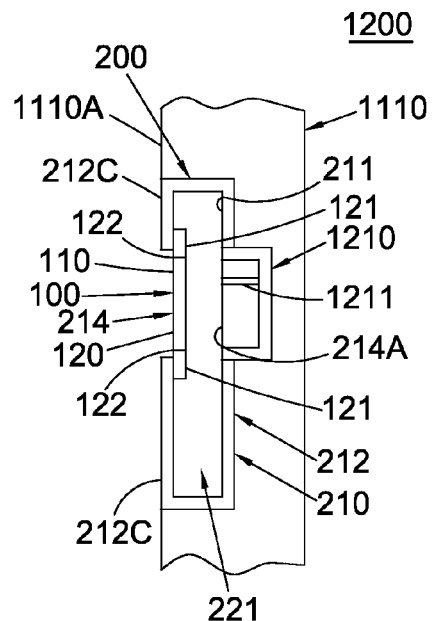
FIG. 33A is an exemplary detail drawing illustrating an embodiment of the switch assembly shown in FIGS. 32A-B that includes a frangible panel assembly and a switch.

In order to help prevent tampering with a fire extinguisher housed within a fire extinguisher cabinet assembly 1000, a frangible panel assembly 200 can be advantageously incorporated into the switch assembly 1200. Turning to FIG. 33A, a switch assembly 1200 is shown coupled to the door 1110. The switch assembly 1200 may be coupled with the door 1110 via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the switch assembly 1200 and the door 1110 relative to one another. The switch assembly 1200 can include a frangible panel assembly 200 and a switch 1210. The switch can include a lever 1211 that operates to lock or unlock the door 1110. The frangible panel assembly 200 includes a panel 100 with a frangible region 120 and a housing 210 with a wall 212. The inner surface 211 of the housing 210 forms (and/or defines) a chamber 221 with an opening 214 and a rear opening 214A. A panel 100 is coupled with an inner surface 211 of a face wall 212C of the housing 210 via any conventional manner as noted above, thereby closing opening 214. The switch 120 is positioned within the rear opening 214A.

Figure 33B:
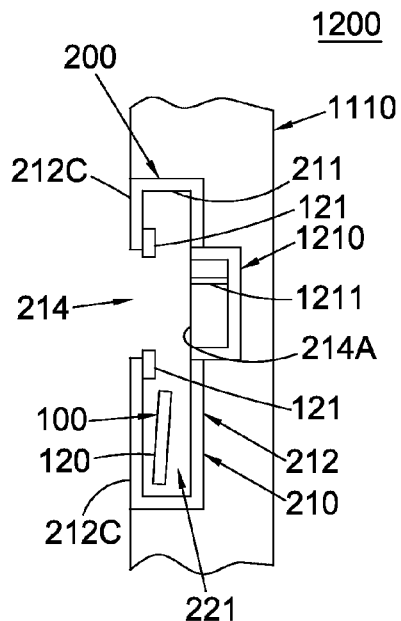
FIG. 33B is an exemplary detail drawing illustrating the switch assembly of FIG. 33A, wherein a frangible region has separated from a remainder of panel and receded into a chamber.
Figure 33C:
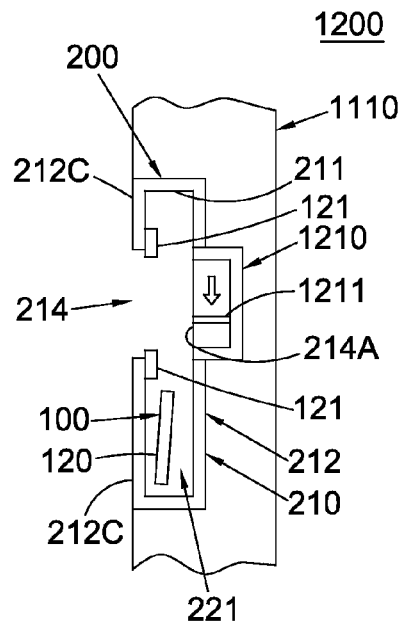
FIG. 33C is an exemplary detail drawing illustrating the switch assembly of FIG. 33A, wherein a lever of the switch is accessible via an opening and the lever has been depressed.

Turning to FIG. 33B, upon sufficient impact, the panel 100 may fail in a predictable manner, allowing the frangible region 120 to break away from a remainder 121 of the panel 100, preferably as an intact unit without internal fracturing, and recede into the chamber 221. Turning to FIG. 33C, the lever 1211 is now safely accessible through the opening 214. The lever 1211 may thus be depressed, thereby unlocking the door 1110.

Figure 34A:
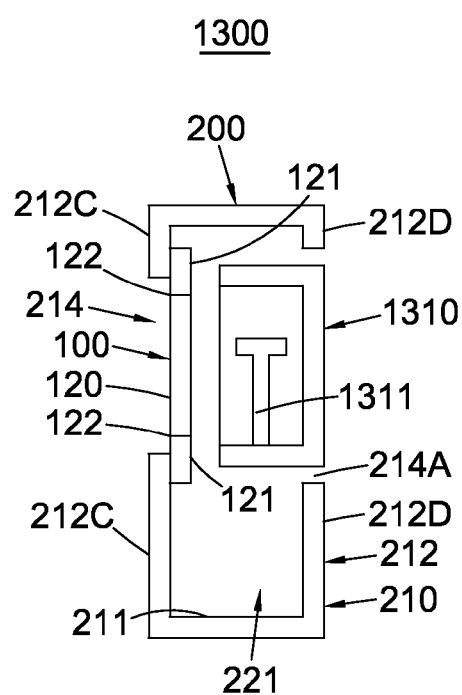
FIG. 34A is an exemplary detail drawing illustrating an embodiment of a fire alarm cover assembly that incorporates a frangible panel assembly.

A similar need exists with respect to helping prevent tampering with fire alarm panels. Indeed, a frangible panel assembly 200 can be advantageously incorporated into a fire alarm cover assembly 1300. Turning to FIG. 34A, the fire alarm cover assembly 1300 can include a frangible panel assembly 200 and a fire alarm panel 1310. The fire alarm panel 1310 can include a t-bar 1311 to activate an alarm. The frangible panel assembly 200 includes a panel 100 with a frangible region 120 and a housing 210 with a wall 212. The inner surface 211 of the housing 210 forms (and/or defines) a chamber 221 with an opening 214 and a rear opening 214A. A panel 100 is coupled with an inner surface 211 of a face wall 212C of the housing 210, thereby closing opening 214. The fire alarm panel 1310 is positioned within the rear opening 214A. The panel 100 can be coupled to the housing 210 achieved via any conventional manner, such as with an adhesive, fasteners, detents or applied force (e.g., magnets, suction cups or friction). The term "detents" refers to any combination of mating elements, such as blocks, tabs, pockets, slots, ramps, locking pins, cantilevered members, support pins, and the like, that may be selectively or automatically engaged and/or disengaged to couple or decouple the panel 100 and the housing 210 relative to one another.

Figure 34B:
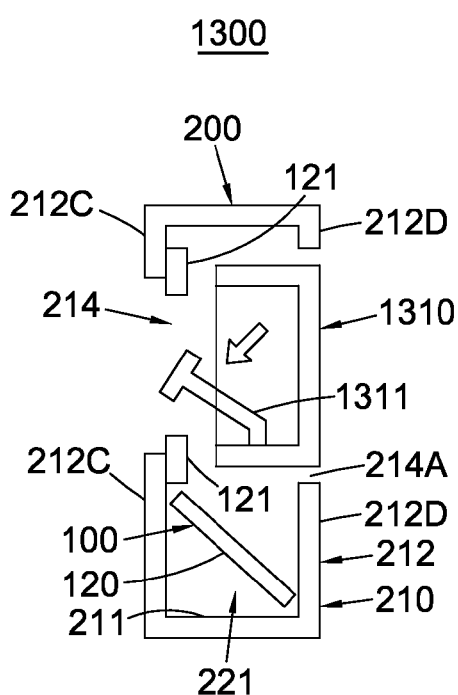
FIG. 34B is an exemplary detail drawing illustrating the fire alarm cover assembly of FIG. 34A, wherein a frangible region has separated from a remainder of panel and receded into a chamber, allowing access to a fire alarm panel.

Turning to FIG. 34B, upon sufficient impact, the panel 100 may fail in a predictable manner, allowing the frangible region 120 to break away from a remainder 121 of the panel 100, preferably as an intact unit without internal fracturing, and recede into the chamber 221. The fire alarm panel 1310 is now safely accessible through the opening 214, and the t-bar 1311 may thus be pulled down, thereby activating an alarm.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A monitor cover for attachment to a housing in which a monitor having a display is disposed, the monitor cover comprising:
    a translucent panel attachable to the housing at two or more points in which the display is visible through the panel;
    a frangible region provided in said panel, in which said panel includes an exterior panel surface facing away from the display when the panel is attached to the housing; and
    a film disposed over the exterior panel surface,
    wherein said frangible region is defined by a notch formed in said panel.

2. The monitor cover of claim 1, wherein the panel includes a perimeter region and the notch is contiguous and disposed proximate the perimeter region.

3. The monitor cover of claim 1, wherein said frangible region is defined by a plurality of notches each formed in said panel.

4. The monitor cover of claim 1, wherein the notch has a cross-sectional shape selected from the group consisting of a triangle, a rectangle, and a semi-circle.

5. The monitor cover of claim 1, wherein the notch varies in at least one of depth and width.

6. The monitor cover of claim 1, wherein said panel is formed from a material selected from the group consisting of toughened glass and polycarbonate.

7. A method for fabricating a monitor cover for attachment to a housing in which a monitor having a display is disposed, the method comprising:
    forming a translucent panel attachable to the housing at two or more points in which the display is visible through the panel;
    forming a frangible region in the panel in which the panel includes an exterior panel surface facing away from the display when the panel is attached to the housing, the frangible region being defined by a notch formed in the panel; and
    disposing a film over the exterior panel surface.

8. The method of claim 7, further comprising toughening the translucent panel.

9. The method of claim 7, wherein said forming the translucent panel comprises using a glass material to form the translucent panel.

10. The method of claim 7, wherein said forming the frangible region comprises notching the panel proximate to a perimeter of the panel.

11. The method of claim 10, wherein said notching comprises forming the notch in the panel having a cross-sectional shape selected from the group consisting of a triangle, a rectangle, and a semi-circle.

12. The method of claim 10, wherein said notching comprises forming the notch varying in at least one of depth and width.

13. The method of claim 7, wherein said forming the frangible region comprises forming a locally limited stress gradient in the panel.

14. The method of claim 7, wherein said forming the frangible region comprises notching the panel proximate a perimeter of the panel in which the notching is contiguous.

15. A frangible panel assembly for covering a video display, the frangible panel assembly comprising:
    a housing;
    a translucent panel attached to the housing at two or more locations and including an exterior panel surface facing away from the display when said panel is attached to said housing, the display being visible through the panel;
    a film disposed over the exterior panel surface;
    a frangible region provided in said panel and being defined by a notch formed in said panel; and
    a touch sensor disposed on the panel.

16. The frangible panel assembly of claim 15, wherein the touch sensor is translucent.

17. The frangible panel assembly of claim 15, further comprising a film disposed on the panel.

18. The frangible panel assembly of claim 17, wherein the panel is disposed between the film and the touch sensor.

19. The monitor cover of claim 1, wherein the notch has a cross-sectional shape selected from a group consisting of a triangle, a rectangle, and a semi-circle.

20. The monitor cover of claim 1, wherein a depth of the notch, a width of the notch or both is not uniform.

* * * * *